United States Patent
Hand et al.

(10) Patent No.: US 11,904,344 B2
(45) Date of Patent: Feb. 20, 2024

(54) SYSTEMS AND METHODS FOR ENHANCED HOT MELT LIQUID DISPENSING SYSTEM MANAGEMENT

(71) Applicant: NORDSON CORPORATION, Westlake, OH (US)

(72) Inventors: Kent P. Hand, Duluth, GA (US); Laurence B. Saidman, Duluth, GA (US)

(73) Assignee: Nordson Corporation, Westlake, OH (US)

( * ) Notice: Subject to any disclaimer, the term of this patent is extended or adjusted under 35 U.S.C. 154(b) by 259 days.

(21) Appl. No.: 17/425,979

(22) PCT Filed: Feb. 26, 2020

(86) PCT No.: PCT/US2020/019798
§ 371 (c)(1),
(2) Date: Jul. 27, 2021

(87) PCT Pub. No.: WO2020/176566
PCT Pub. Date: Sep. 3, 2020

(65) Prior Publication Data
US 2022/0212226 A1    Jul. 7, 2022

Related U.S. Application Data

(60) Provisional application No. 62/810,380, filed on Feb. 26, 2019.

(51) Int. Cl.
*B05C 11/10*    (2006.01)
*B05C 5/02*    (2006.01)

(52) U.S. Cl.
CPC ............ *B05C 11/1042* (2013.01); *B05C 5/02* (2013.01); *B05C 11/1007* (2013.01)

(58) Field of Classification Search
CPC .................................................. B05C 11/1042
See application file for complete search history.

(56) References Cited

U.S. PATENT DOCUMENTS

| | | | |
|---|---|---|---|
| 8,097,836 B2 | 1/2012 | Raterman | |
| 2003/0080156 A1* | 5/2003 | Jeter | B05C 11/1044 222/146.5 |

(Continued)

FOREIGN PATENT DOCUMENTS

| | | |
|---|---|---|
| CN | 1692991 A | 11/2005 |
| CN | 103785580 A | 5/2014 |
| CN | 103835931 A | 6/2014 |
| CN | 106999962 A | 8/2017 |
| CN | 109195714 A | 1/2019 |

(Continued)

OTHER PUBLICATIONS

ISA/220—Notification of Transmittal or Search Report and Written Opinion of the ISA/237, or the Declaration dated Oct. 22, 2020 for WO Application No. PCT/US20/019798.

(Continued)

*Primary Examiner* — Jeremy Carroll
(74) *Attorney, Agent, or Firm* — BakerHostetler

(57) ABSTRACT

Systems and methods for enhanced hot melt liquid dispensing system management are disclosed. In an example method for determining an operating instruction for a hot melt liquid dispensing system having an applicator and a heater, the operating instruction is determined based on a filtered applicator parameter value associated with gun cycle counts of the applicator and a filtered heater parameter value associated with duty cycle values of the heater. The filtered applicator parameter value is determined based on historic applicator parameter values that are updated according to a current applicator parameter value. The filtered heater parameter value is determined based on historic heater parameter values that are updated according to a current heater parameter value.

50 Claims, 6 Drawing Sheets

(56) References Cited

U.S. PATENT DOCUMENTS

| | | | |
|---|---|---|---|
| 2003/0180035 A1* | 9/2003 | Jamison | B05C 11/1042 392/471 |
| 2005/0011967 A1 | 1/2005 | Skelton-Becker et al. | |
| 2005/0095359 A1* | 5/2005 | Pallante | B05C 11/1042 427/207.1 |
| 2005/0230423 A1 | 10/2005 | Riney et al. | |
| 2006/0249532 A1* | 11/2006 | Bourget | G05B 19/048 222/54 |
| 2009/0145923 A1 | 6/2009 | Raterman | |
| 2014/0116525 A1* | 5/2014 | Bondeson | B05C 11/1007 137/13 |
| 2014/0117050 A1 | 5/2014 | Beal et al. | |
| 2016/0097385 A1 | 4/2016 | Estelle | |
| 2017/0284844 A1 | 10/2017 | Fort et al. | |
| 2018/0065142 A1 | 3/2018 | Saine | |
| 2020/0301454 A1 | 9/2020 | Ahmadi et al. | |

FOREIGN PATENT DOCUMENTS

| | | |
|---|---|---|
| EP | 3360616 A1 | 8/2018 |
| EP | 4140600 A1 | 3/2023 |
| JP | 2012-081376 A | 4/2012 |
| JP | 2014-083540 A | 5/2014 |
| JP | 2015-523903 A | 8/2015 |
| KR | 2017-0113791 A | 10/2017 |
| KR | 10-2018-0062556 A | 6/2018 |

OTHER PUBLICATIONS

Observations by third parties Mailed on Sep 28, 2022 for EP Application No. 20713140, 8 page(s).

European search report dated Jan. 25, 2023 for EP Application No. 22195821.

* cited by examiner

SYSTEMS AND METHODS FOR ENHANCED HOT MELT LIQUID DISPENSING SYSTEM MANAGEMENT

CROSS REFERENCE TO RELATED APPLICATIONS

This application is a National Stage Application of International Patent App. No. PCT/US2020/019798, filed Feb. 26, 2020, which claims the benefit of U.S. Provisional Patent App. No. 62/810,380, filed Feb. 26, 2019, the entire disclosures of both of which are hereby incorporated by reference as if set forth in their entirety herein.

TECHNICAL FIELD

This disclosure generally relates to liquid dispensing and, more particularly, to enhanced hot melt liquid dispensing system management.

BACKGROUND

Hot melt liquid dispensing systems find use in a variety of applications. For example, such a system may apply hot melt adhesives during the manufacture of disposable hygiene products. As another example, a hot melt liquid dispensing system may apply hot melt adhesive to assemble various types of packaging, such as paper-based packaging for food and beverages. Hot melt adhesives used in such applications may include moisture curing hot-melt polyurethane adhesives ("hot-melt PURs"), which are often used where a stable surface-to-surface bond must be formed. Other conventional hot melt adhesives may be used in securing a variety of both similar and dissimilar materials together in a mating relationship, such as wood, plastics, corrugated films, paper, carton stocks, metals, rigid polyvinylchlorides (PVCs), fabrics, leathers, and others. Hot melt adhesives may be especially useful in applications where it is desirable to have the adhesive solidify rapidly after being melted and dispensed.

In an example configuration of a hot melt liquid dispensing system, a solid form of hot melt adhesive is supplied to a melter comprising a heated tank and/or a heated grid to produce molten hot melt adhesive. After heating, the molten adhesive is pumped through a heated hose to an applicator, which is sometimes referred to as a dispensing "gun" or a gun module, comprising a valve and a nozzle. A hot melt adhesive liquid dispensing system may comprise two or more applicators. An applicator may comprise its own heater(s) to further maintain the temperature of the hot melt adhesive before it is dispensed. Yet operating a hot melt adhesive dispensing system at an ideal efficiency presents a number of challenges. For example, hot melt adhesive becomes discolored and degrades over time. This may be particularly so while the hot melt adhesive is held at the higher temperatures needed for application and/or over longer periods of time. The problem may be aggravated in systems with relatively low flow rates.

Degraded hot melt adhesive may tend to stick to the interior surfaces of hoses and other components of the hot melt adhesive dispensing system, thereby inhibiting the effective flow of hot melt adhesive. Degraded hot melt adhesive may further char with blackened or burned portions of adhesive. Degraded hot melt adhesive may cause a number of issues in a dispensing system, including filter and applicator clogging and more frequent cleaning of the hoses that deliver hot melt adhesive to an applicator. Degraded hot melt adhesive may generally result in increased system maintenance and repairs and reduced operational up-time.

These and other shortcomings are addressed in the present disclosure.

SUMMARY

Disclosed herein are system and methods for managing a hot melt liquid dispensing system having an applicator configured to dispense hot melt liquid and a hot melt liquid heater associated with the applicator. In an example method for determining an operating instruction for the hot melt liquid dispensing system, a plurality of historic applicator parameter values of a first operating parameter of the applicator and a plurality of historic heater parameter values of a second operating parameter of the hot melt liquid heater are provided. Each historic applicator parameter value of the plurality of historic applicator parameter values is temporally associated with a historic time interval of a historic block of time. Each historic heater parameter value of the plurality of historic heater parameter values is associated with the historic time interval of the historic block of time. A current applicator parameter value of the first operating parameter of the applicator and a current heater parameter value of the second operating parameter of the hot melt liquid heater are received. The current applicator parameter value is temporally associated with a current time interval that corresponds to a first historic time interval of the historic block of time and the current heater parameter value is associated with the current time interval. A filtered applicator parameter value of the first operating parameter of the applicator is determined based on the current applicator parameter value and a historic applicator parameter value of the plurality of historic applicator parameter values that is temporally associated with the first historic time interval. A filtered heater parameter value of the second operating parameter associated with the hot melt liquid heater is determined based on the current heater parameter value and a historic heater parameter value of the plurality of historic heater parameter values that is temporally associated with the first historic time interval. Based on the filtered applicator parameter value and the filtered heater parameter value, an instruction is determined for operating the hot melt liquid dispensing system according to an operating parameter value of a third operating parameter of the hot melt liquid dispensing system.

In an example method for predicting failure of the applicator of the hot melt liquid dispensing system, a plurality of applicator parameter values of a first operating parameter of the applicator and a plurality of heater parameter values of a second operating parameter of the hot melt liquid heater are provided. Each applicator parameter value of the plurality of applicator parameter values is temporally associated with a time interval of a first block of time and each heater parameter value of the plurality of heater parameter values is associated with an applicator parameter value of the plurality of applicator parameter values. First and second subsets of applicator parameter values of the plurality of applicator parameter values are determined. Each applicator parameter value of the first subset of applicator parameter values indicates no dispensing activity of the applicator for the temporally associated time interval of the first block of time. Each applicator parameter value of the second subset of applicator parameter values indicates dispensing activity of the applicator for the temporally associated time interval of the first block of time. First and second subsets of heater parameter values of the plurality of heater parameter values are determined. Each heater parameter value of the first subset of applicator parameter values is associated with an applicator parameter value of the first subset of applicator parameter values and each heater parameter value of the second subset of heater parameter values is associated with an applicator parameter value of the second subset of applicator parameter values. A predicted time of failure of the applicator is determined based on the first subset of heater parameter values and the second subset of heater parameter values.

BRIEF DESCRIPTION OF DRAWINGS

The accompanying drawings, which are incorporated in and constitute a part of this specification, illustrate embodiments and together with the description, serve to explain the principles of the methods and systems.

Aspects of the disclosure will now be described in detail with reference to the drawings, wherein like reference numbers refer to like elements throughout, unless specified otherwise.

DETAILED DESCRIPTION

The systems and methods of the present disclosure relate to enhanced hot melt liquid dispensing system management. The enhanced hot melt liquid dispensing system management may be implemented in a dispensing system for hot melt adhesives. Although reference shall be made primarily to hot melt adhesive, the techniques described herein may be applicable to any sort of hot melt liquid, including non-adhesives.

Figure 1:
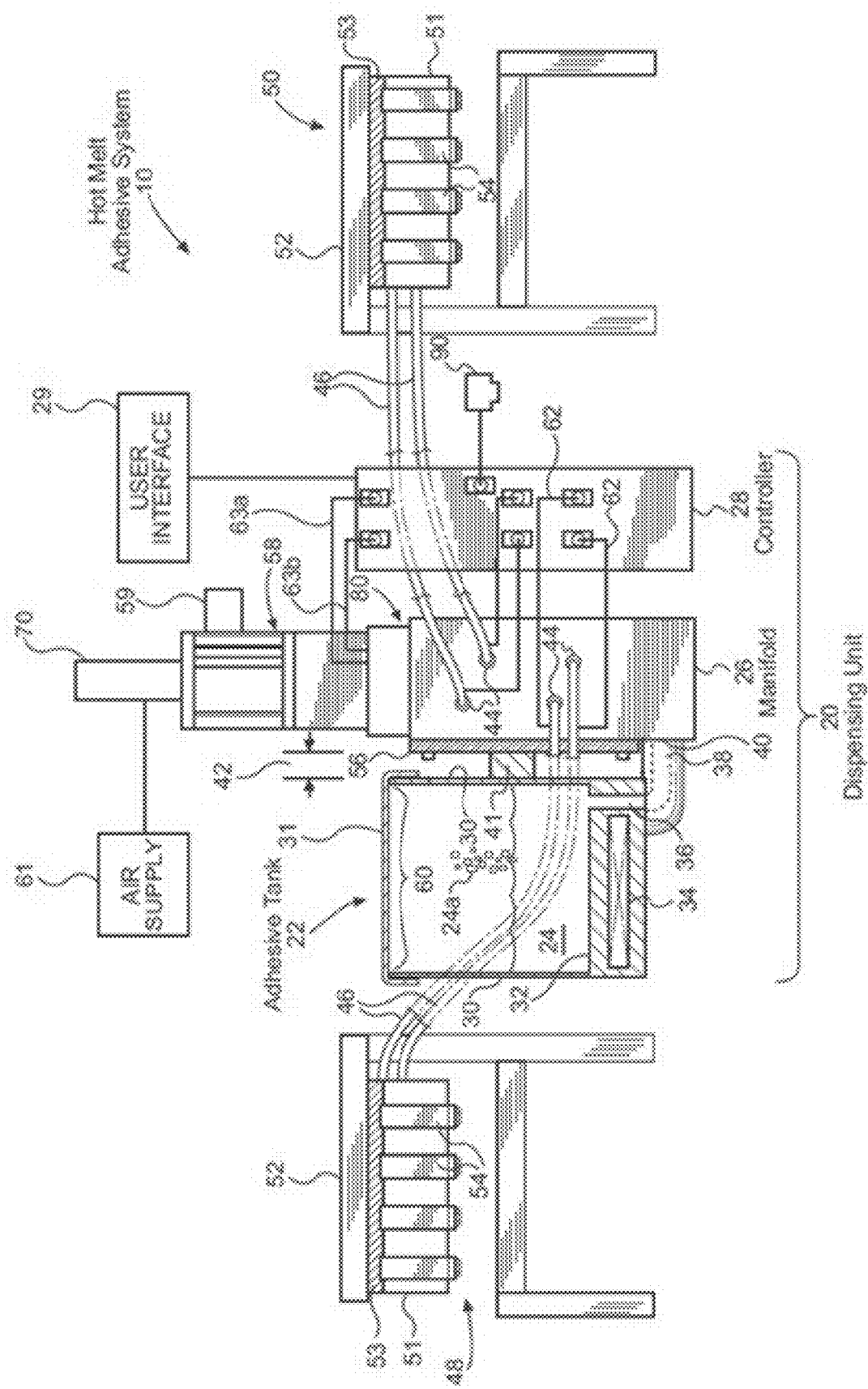
FIG. 1 illustrates an example dispensing system according to an embodiment of the present disclosure.

FIG. 1 illustrates an example hot melt adhesive system 10 with which the techniques described herein may be implemented. The hot melt adhesive system 10 comprises a dispensing unit 20 that includes an adhesive supply 22 for receiving and melting solid or semi-solid hot melt adhesive 24a, such as pellets, a manifold 26 connected to the adhesive supply 22, a controller 28, and a user interface 29. The adhesive supply 22 may be a tank-style melter, or a grid and reservoir melter, among others. Upon melting, the solid or semi-solid hot melt adhesive 24a stored in the adhesive supply 22 transforms into a liquid hot melt adhesive 24. The adhesive supply 22 comprises side walls 30, a removable cover 31, and a base 32 which includes one or more adhesive supply heaters 34 for melting and heating the hot melt adhesive 24a and the liquid hot melt adhesive 24 in the adhesive supply 22. An adhesive supply outlet 36 proximate the base 32 is coupled to a passage 38 which connects to an inlet 40 of the manifold 26.

A positive-displacement pump 58, such as a vertically-oriented piston pump (as shown) or a gear pump, is coupled to the manifold 26 for pumping liquid hot melt adhesive 24 from the adhesive supply 22 into the manifold 26, where it is split into separate flows. A pump motor 59 drives the pump 58. The manifold 26 is mounted to a side wall 30 of the adhesive supply 22 with a spacer 41 and is spaced from the adhesive supply 22 a distance 42 sufficient to provide thermal isolation of the adhesive supply 22 from the manifold 26. The manifold 26 includes a plurality of outlet ports 44 which may be fitted with heated hoses 46 attached to one or more adhesive applicators 48, 50 to supply the liquid adhesive 24 to the applicators 48, 50. The manifold 26 may include a manifold heater 56 which is separate from the adhesive supply heater 34 and which can be independently controlled by the controller 28. In some embodiments, a single heater can be used for heating the adhesive supply 22 and the manifold 26. While FIG. 1 shows the adhesive supply 22 in close physical proximity to the manifold 26, other arrangements are also possible where the source of hot melt adhesive is physically distant from the manifold. In such arrangements, more than one pump may be used to move hot melt adhesive from the adhesive supply 22 toward the ultimate point of application.

The manifold 26 may create a plurality of flow streams that are carried by the corresponding heated hoses 46 to the applicators 48, 50. The hoses 46 are electrically coupled to the controller 28 by cord sets 62 associated with each hose 46. The applicators 48, 50 include one or more adhesive dispensing modules 54 configured to dispense/apply the liquid hot melt adhesive 24 to a product, such as a carton, package, or other object. The adhesive dispensing modules 54 are mounted to applicator bodies 51 having applicator heaters 53 and are supported on a frame 52. The hot melt adhesive system 10 includes two applicators 48, 50, with one applicator located on each side of the dispensing unit 20 as shown in FIG. 1, although other implementations of the hot melt adhesive system 10 may use a different number of applicators, dispensing modules, and other configurations. For example, the applicators 48, 50 may be each configured with a single adhesive dispensing module 54 or may be each configured with a pair of adhesive dispensing modules 54. The adhesive dispensing modules 54 of an applicator 48, 50 may be commonly monitored, controlled, and actuated by a common air supply. Alternatively, the adhesive dispensing modules 54 of an applicator 48, 50 may be independently monitored, controlled, and actuated by separate air supplies. An applicator 48, 50 and/or an adhesive dispensing module 54 may be variously referred to as an applicator or dispenser.

The pump 58 is located external to the adhesive supply 22 and is connected to an air pressure regulator 70 that receives air from an air supply 61. More particularly, the air pressure regulator 70 is mounted to the dispensing unit 20 and connects to the air supply 61. In some implementations, the pump 58 may be attached to the manifold 26 and heated by the manifold heater 56. This arrangement permits a larger tank opening 60, increases the tank capacity, and reduces the time required to heat the pump 58. Further, a flow meter 80 may be attached to the manifold 26. The flow meter 80 comprises a pair of sensors that are electrically coupled to the controller 28 by respective cords 63a, 63b associated with each sensor. At least one product detector 90, such as a photo-sensor, is also electrically coupled to the controller 28.

The dispensing unit 20 includes the controller 28 which houses the power supply and electronic controls for the hot melt adhesive system 10. The controller 28 may be configured to monitor, store, and set values for the various operating parameters of the hot melt adhesive system 10 and components thereof. For example, the controller 28 may be configured to capture one or more operating parameter values at set time intervals (e.g., every five minutes) and store those captured operating parameter values. Additionally or alternatively, the controller 28 may transmit collected and/or stored operating parameter values to a remote computer system. As such, the controller 28 may be configured with one or more processors and memory configured to store instructions that, when executed by the one or more processors, cause the controller 28 to effectuate various operations described herein. The controller 28 may be configured with a network interface (e.g., wired or wireless) to communicate with remote computer systems, such as to transmit the aforementioned collected and/or stored operating parameter values to a remote computer system.

The controller 28 may be configured to monitor, store, and set values for the operating parameters of the applicators 48, 50 and adhesive dispensing modules 54, including those operating parameters associated with dispensing hot melt adhesive. Such parameters may include a count of "gun cycles" of the applicators 48, 50 and/or the adhesive dispensing modules 54. A gun cycle may refer to a single, discrete instance of adhesive dispensing or application, such as an open-and-close cycle of a nozzle valve of an adhesive dispensing module 54. A gun cycle count may refer to the gun cycles of a single adhesive dispensing module 54, the gun cycles of a single applicator 48, 50 (and adhesive dispensing modules 54 thereof), or the gun cycles of multiple (or all) constituent applicators 48, 50 of the hot melt adhesive system 10. A count of gun cycles may refer to an absolute count of gun cycle, a rate of gun cycles, and/or a count of gun cycles within an interval of time. The controller 28 may also monitor, store, and set the operating modes of the applicators 48, 50 and adhesive dispensing modules 54, such as an "on" mode, an "off" mode, and a "ready" mode. An applicator 48, 50 or adhesive dispensing module 54 may be in "on" mode yet not be in a "ready" mode, such as may be the case during an on-going initialization process or if associated hot melt adhesive is not yet up to an operating temperature suitable or preferred for dispensing. An applicator 48, 50 or adhesive dispensing module 54 may be in ready mode when associated hot melt adhesive is at a temperature suitable or preferred for dispensing.

With respect to the heating features of the hot melt adhesive system 10, the controller 28 is electrically coupled to the heaters, including the adhesive supply heater 34, the manifold heater 56, and the applicator heaters 53, as well as any hose heaters. The controller 28 may also be coupled with various temperature sensors in the hot melt adhesive system 10, which may be associated with or included in the adhesive supply heater 34, the manifold heater 56, the applicator heaters 53, and any hose heaters. The controller 28 independently monitors and adjusts the adhesive supply heater 34, the manifold heater 56, the applicator heaters 53, and any hose heaters, to melt solid or semi-solid hot melt adhesive 24a received in the adhesive supply 22 and to maintain the temperature of (melted) hot melt adhesive 24 to ensure proper viscosity of the hot melt adhesive 24 supplied to the applicators 48, 50 and dispensed by the adhesive dispensing modules 54. For instance, the controller 28 receives temperature information from temperature sensors (a current temperature value) and sends heater control instructions to each heater to adjust the temperature (a target temperature value). Such heater control instructions may increase or decrease the temperature of any or all of the heaters in the hot melt adhesive system 10.

A current or target temperature may be an operating temperature at which the hot melt adhesive is suitable or preferred for application or dispensing. A current or target temperature also may be a lower "setback" temperature. Hot melt adhesive held a setback temperature may undergo less charring and other degradations that may otherwise occur if the hot melt adhesive were held at a higher temperature, such as the operating temperature. Hot melt adhesive held at a setback temperature may not have the viscosity or other attributes preferred for dispensing. Holding hot melt adhesive at a setback temperature may be useful, for example, when there is a brief to moderate lull in operations. In this or similar instances, the hot melt adhesive may be reduced to the setback temperature to reduce degradation and discoloration during the lull but may be brought back to operating temperature relatively quickly when dispensing operations are to resume.

Further to the above, the controller 28 may thus monitor, store, and set the various operating parameter values associated with a temperature of the hot melt adhesive within the hot melt adhesive system 10. In addition to the current and target temperature values for the adhesive supply heater 34, the manifold heater 56, the applicator heaters 53, and hoses 46, the controller 28 may also monitor, store, and set duty cycle information for any or all of the noted heaters. For example, the controller 28 may monitor, store, and set duty cycle information for the adhesive supply heater 34. The duty cycle of a heater may refer to a percentage or ratio of time that the heater is activated (i.e., heating the associated hot melt adhesive) within an interval of time. Such interval of time for the duty cycle may coincide with the interval of time by which the controller 28 may collect other various operating parameter values of the hot melt liquid adhesive system 10, including gun cycle data. For example, a duty cycle value of a heater may be 20% activation over a ten minute time interval, thus indicating that the heater was activated for two minutes (e.g., cumulatively) over the ten minutes.

In an aspect, the duty cycle may be controlled according to a shorter time interval (a duty cycle sub-time interval) than the time interval by which the controller 28 collects other operating parameter values of the hot melt adhesive system 10. For example, the temperature of the heater may be evaluated and the duty cycle adjusted accordingly every 30 seconds, while the time interval by which other operating parameters of the hot melt adhesive system 10 are collected may be a 10 minute time interval. In an aspect, the duty cycle values for the multiple shorter duty cycle sub-time intervals within the longer time interval may be averaged and that average may be used as a representative duty cycle value for the longer time interval. In another aspect, the duty cycle value for one of the multiple shorter duty cycle sub-time intervals within the longer time interval may be used as a representative duty cycle value for the longer time interval. For example, the duty cycle value for the last duty cycle sub-time interval within the longer time interval may be used as the representative duty cycle value for the longer time interval.

The duty cycle of a heater is not typically a settable operating parameter. Rather, a temperature is typically specified for a heater and the duty cycle of the heater adjusts to maintain this temperature for the hot melt adhesive within the heater. The duty cycle of a heater may be also based on the operation of an associated applicator 48, 50 and/or adhesive dispensing module 54, such as a count of gun cycles within a time interval. That is, the duty cycle of a heater is typically a function, at least in part, of the operation of the associated applicator 48, 50 and/or adhesive dispensing module 54. For example, an increased gun cycle count within a time interval may cause a similarly increased duty cycle value of an associated heater during the time interval. The increased duty cycle value may be needed to maintain the flow of hot melt adhesive to the associated applicator 48, 50 and/or adhesive dispensing module 54 at the dispensing temperature. As an example, the duty cycle value of the applicator heaters 53 over a time interval may be a function of the count of gun cycles of the applicator 48 (and/or adhesive dispensing modules 54 thereof) during the time interval. The time interval for a duty cycle value may be temporally offset (e.g., after) from the time interval for the gun cycle count associated with said duty cycle value. This may be due to a delay in demand by the applicator 48, 50 or adhesive dispensing module 54 for hot melt adhesive supplied by the associated heater.

The duty cycle of a heater further may be affected by the functional state of an associated applicator 48, 50 and/or adhesive dispensing module 54, such as whether the applicator 48, 50 and/or adhesive dispensing module 54 is operating as intended. For example, an applicator 48, 50 and/or adhesive dispensing module 54 that leaks air may be associated with an increased duty cycle of the corresponding applicator heater 53.

Figure 2:
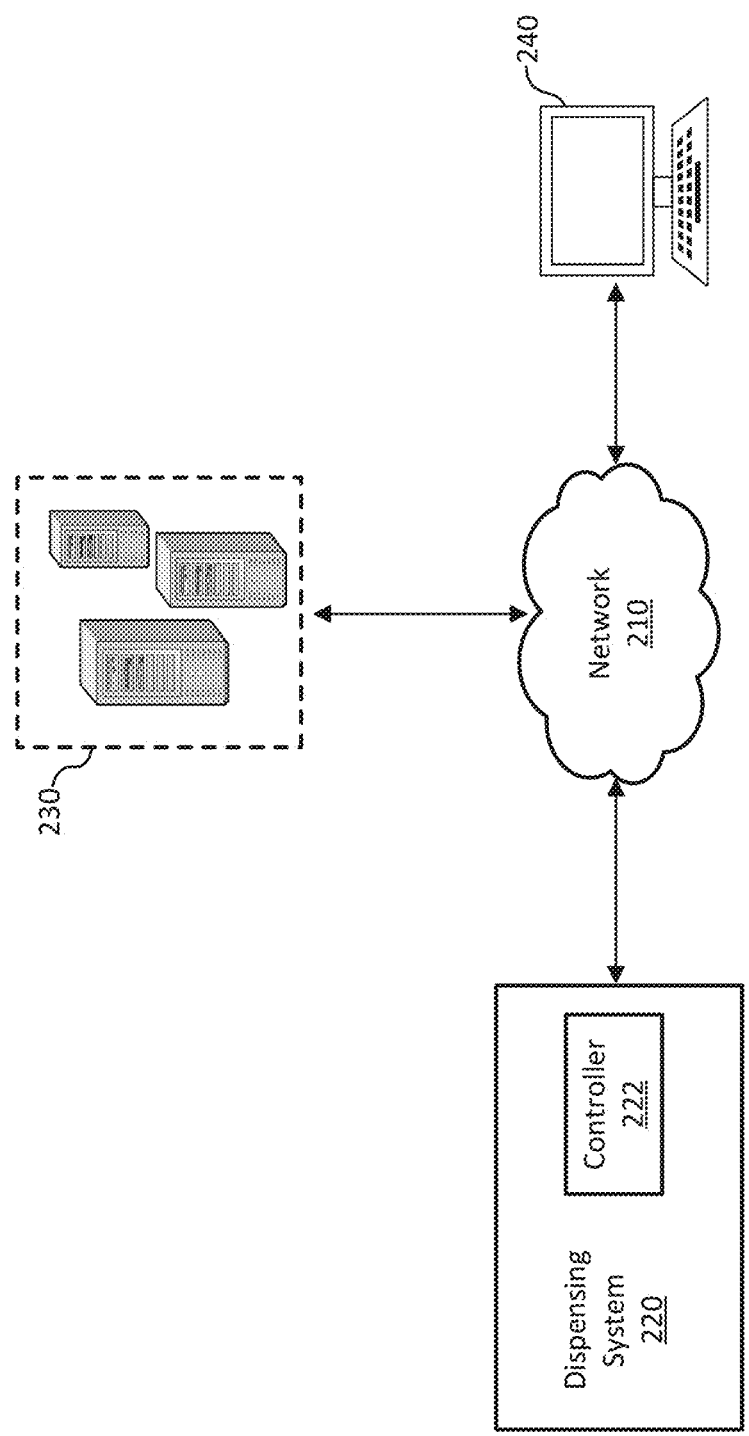
FIG. 2 illustrates an example system and network configuration according to an embodiment of the present disclosure.

FIG. 2 illustrates an example system and network configuration according to which the techniques described herein may be implemented. In such a configuration, a dispensing system 220 (e.g., the hot melt adhesive system 10 of FIG. 1), a computer system 230, and a client device 240 may be in mutual communication via a network 210. Communication with the dispensing system 120 may be effectuated via a controller 222 (e.g., the controller 28 of FIG. 1) of the dispensing system 220. The network 210 may comprise one or more wired and/or wireless networks. To name some examples, the network 210 may comprise the Internet, an intranet, a (wireless) local area network, and/or a cellular network.

As noted with respect to FIG. 1, the controller 222 may collect, store, set, and transmit various operating parameter values of the components of the dispensing system 220, including various operating parameter values of any applicators (e.g., the applicators 48, 50 and adhesive dispensing modules 54 of FIG. 1) and various operating parameter values of any heater components (e.g., the adhesive supply heaters 34, manifold heater 56, hose heaters, and applicator heaters 53 of FIG. 1). An operating parameter of a dispensing component may include a count of gun cycles within a time interval or other indicator of gun cycle rate or count. An operating parameter of a heater component may include a duty cycle value of the heater component for a time interval.

The computer system 230 may comprise one or more computing devices, such as various computer servers and network devices. The computer system 230 may comprise one or more networked computing devices. The computer system 230 may be located remote from the dispensing system 220. For example, the computer system 230 may comprise a cloud computer system. By contrast, the dispensing system 220 may be located at a manufacturing or assembly facility or other type of plant or factory. The computer system 230 may be associated with a manufacturer of at least a portion of the dispensing system 220. The owner/operator of the dispensing system 220 may be an ongoing client or customer of the manufacturer.

The client device 240 may comprise a computing device, including a desktop computer, a laptop computer, a tablet computer, or a mobile device (e.g., a smart phone). The client device 240 may be configured with one or more input and output components, which may enable a user to view and interact with data from the computer system 230. For example, a user may use the client device 240 to view and approve a proposed operating schedule of the dispensing system 220 that was determined by the computer system 230. The client device 240 may be disposed at the same location as the dispensing system 220 or may be remote from the dispensing system 220. The client device 240 may be associated with personnel overseeing the dispensing system 220.

In operation, the dispensing system 220 may determine historic (i.e., past) and current parameter values of one or more operating parameters associated with a temperature of hot melt adhesive of the dispensing system 220. For example, the dispensing system 220 may determine one or more historic and current parameter values indicating a duty cycle of a heater associated with an applicator of the dispensing system 220. The dispensing system 220 may further determine historic and current parameter values of one or more operating parameters associated with the applicator of the dispensing system 220. For example, the dispensing system 220 may determine historic and current parameter values indicating a gun cycle count of the applicator of the dispensing system. The dispensing system 220 may transmit the above-noted historic and current parameter values to the computer system 230 via the controller 222.

The computer system 230 may receive the historic and current parameter values from the dispensing system 220. In some instances, the computer system 230 may already store the historic parameter values, having received them earlier from the dispensing system 220. The computer system 230 may process the historic and current parameter values to determine a schedule for the dispensing system 220. For example, the parameter values may be filtered, such as determining a moving average for each operating parameter. The schedule may be determined based on temporal trends of the parameter values. The trends may reflect a time or time range that the dispensing system 220 is not in active operation to dispense hot melt adhesive, such as when facility personnel are on break or the facility is otherwise closed. The schedule may indicate one or more instructions for operating the dispensing system 220. The schedule may indicate times and conditions according to which one or more heaters of the dispensing system 220 are to operate. For example, the schedule may indicate one or more times that a heater is to go from an off mode to an on mode or from an on mode to an off mode. The schedule may indicate a target temperature for the heater as well as a time that the heater is to begin heating (or allowing to cool) associated hot melt adhesive to that target temperature. The target temperature may be a dispensing temperature or a setback temperature.

The computer system 230 may transmit the (proposed) schedule to the client device 240, which may be associated with a user charged with oversight of the dispensing system 220. The user may review the schedule at the client device 240 and approve or reject the schedule. If approved, the schedule may be given effect at the dispensing system 220. If the schedule is rejected, the computer system 230 may be so notified and determine an alternative proposed schedule. The alternative schedule may be transmitted to the client device 240 for approval, and so on.

Figure 3:
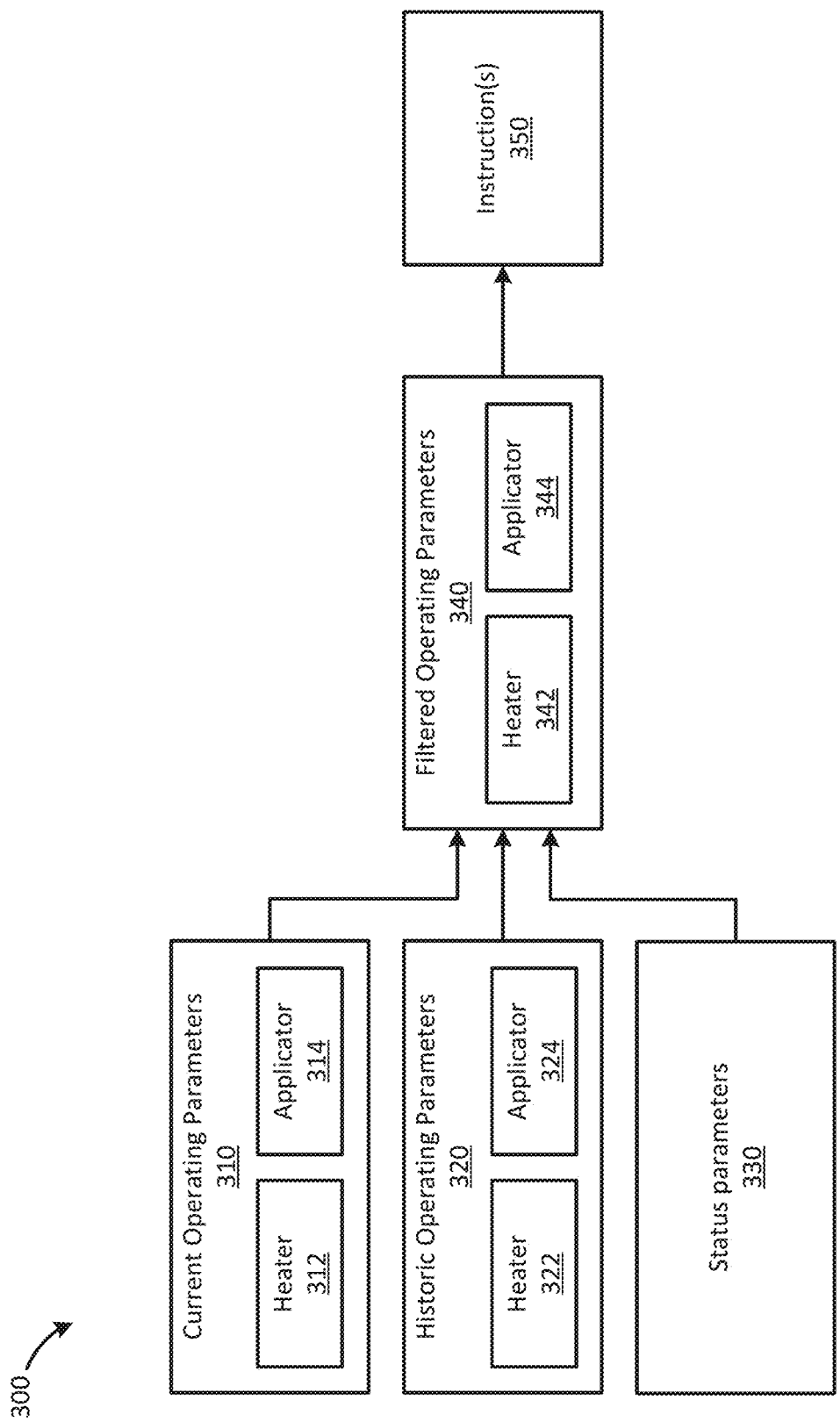
FIG. 3 illustrates an example data flow diagram according to an embodiment of the present disclosure.

FIG. 3 illustrates an example data flow diagram 300 according to an embodiment of the disclosure. In the data flow diagram 300, one or more filtered operating parameters 340 are determined based on one or more current operating parameters 310, one or more historic operating parameters 320, and one or more status parameters 330. The filtered operating parameters 340 may be determined by filtering the historic operating parameters 320 based on the current operating parameters 310. For example, the historic operating parameters 320 may comprise a plurality of moving averages for the respective historic operating parameters 320. The plurality of moving averages may be updated based on corresponding current operating parameters 310 to determine the filtered operating parameters 340. The plurality of moving averages for the filtered operating parameters 340 may be determined on a time interval-by-time interval basis for corresponding time intervals of the current operating parameters 310 and historic operating parameters 320. One or more instructions 350 may be determined based on the filtered operating parameters 340.

The current operating parameters 310 may comprise one or more operating parameters according to which a dispensing system (e.g., the hot melt adhesive system 10 of FIG. 1 or the dispensing system 220 of FIG. 2) operates. More particularly, the current operating parameters 310 may comprise one or more parameter values of the current operating parameters 310. Similarly, the historic operating parameters 320 may comprise one or more operating parameters according to which the dispensing system operates. Also more particularly, the historic operating parameters 320 may comprise one or more parameter values of the historic operating parameters 320. A parameter value may correspond with a pre-determined time interval. More than one parameter value may be associated with a same time interval, such as both a heater duty cycle parameter value and an applicator gun cycle count parameter value. A duration of a time interval may be in the range of one to ten minutes, inclusive. An example time interval duration may be five minutes. Another example time interval duration may be ten minutes.

The parameter values of the historic operating parameters 320 may be with respect to historic (i.e., past) time intervals. That is, a historic parameter value of the historic operating parameters 320 may correspond with a time interval prior to a current time interval. Further, each historic parameter value of the historic operating parameters 320 may correspond with a historic time interval of a plurality of time intervals prior to a current time interval. The parameter values of the current operating parameters 310 may be with respect to a current time interval. A current parameter value of the current operating parameters 310 may correspond with a current time interval. The current time interval may be subsequent to the historic time intervals associated with the historic operating parameters 320. The term "current," as used here and elsewhere in the disclosure, is to be taken in the broad, general sense rather than a literal one. For example, a "current" time interval may be minutes, hours, or days prior to the time at which the filtered operating parameters 340 are determined. In some aspects, current parameter values may refer to recent or most recent measurements for the operating parameters that are used to determine the filtered operating parameters 340. For example, a current parameter value may be contrasted to a historic parameter value in that a historic parameter value may represent a moving average of the parameter based on previous values of the parameter whereas a corresponding current parameter value may comprise a value of the parameter that is subsequent (e.g., measured or determined subsequent) to those values making up the moving average.

In some aspects, current parameter values may refer to a plurality of parameter values for a pre-determined block of time. For example, a pre-determined block of time may be a portion of a day, a day, multiple days, or a week. Historic parameter values may likewise refer to a plurality of parameter values for a pre-determined block of time (e.g., a portion of a day, a day, multiple days, or a week) that is prior to a current block of time. A block of time may comprise a plurality of time intervals (e.g., five minute time intervals), with each time interval of the block corresponding to one or more parameter values. For example, current parameter values may be those parameter values at respective time intervals during a recent week and historic parameter values may be or represent (e.g., as moving averages) those parameter values for corresponding respective time intervals during the prior week or weeks. A block of time may be subdivided, such as a week subdivided into multiple days of the week. A particular current parameter value within a current block of time may correspond with a historic parameter value (or moving average thereof) at the same relative time interval within the blocks of time. For example, a current parameter value for the Tuesday, 11:30-11:35 relative time interval within the current block of time (a current week) may correspond with the historic parameter value (or moving average thereof) for the same Tuesday, 11:30-11:35 relative time interval but within the historic block of time (previous week(s)). The relationship between current parameter values within a current block of time and historic parameter values within a historic block of time will be discussed further in relation to FIG. 4.

As noted, a historic parameter value of a historic operating parameter 320 may be a moving average based on prior historic parameter values of the particular historic operating parameter 320. A moving average of a historic parameter value may be for a particular time interval relative to a block of time, such as the 15:30-15:35 time interval for two or more successive Wednesdays. Thus, the moving average of the historic parameter value for the Wednesday, 15:30-15:35 time interval may be based on the parameter values for the 15:30-15:35 time interval of previous Wednesdays. A moving average may comprise a simple moving average, a cumulative moving average, or a weighted moving average. A moving average may include an exponential moving average, which is also known as an exponentially weighted moving average.

The current operating parameters 310 may comprise a heater parameter 312 associated with a current temperature of hot melt adhesive of the dispensing system. Particularly, the current operating parameters 310 may comprise a current parameter value of the heater parameter 312. The historic operating parameters 320 may likewise comprise a heater parameter 322 associated with one or more historic temperatures of hot melt adhesive of the dispensing system. Particularly, the historic operating parameters 320 may comprise one or more historic heater parameter 322 values. A historic heater parameter 322 value may be a moving average for the historic heater parameter 322 based on previous heater parameter values of the particular historic heater parameter 322.

The heater parameters 312, 322 may be an operating parameter of a heater of the dispensing system. Such heater may comprise a melter (e.g., the adhesive supply 22 with adhesive supply heater 34 of FIG. 1), a heated hose (e.g., the heated hoses 46), an applicator heater (e.g., the applicator heater 53), or a manifold heater (e.g., the manifold heater 56). In an embodiment, the heater comprises an applicator heater of an applicator. The heater parameters 312, 322 may include a duty cycle of the associated heater. A duty cycle parameter value may indicate a percentage or ratio of time within a time interval during which the heater is activated. A duty cycle may be controlled on a shorter time interval (a duty cycle sub-time interval) than the time interval at which other operating parameters 310, 320 are collected. For example, a heater's duty cycle may be updated on a 30 second duty cycle sub-time interval while the time interval at which other operating parameters 310, 320 are collected may be 5 or 10 minutes. The temperature of the heater may be checked according to the shorter duty cycle sub-time intervals and the duty cycle of the heater may be adjusted accordingly to maintain a target temperature. A duty cycle parameter value may indicate an average duty cycle value within a time interval, such as the average duty cycle value over the duty cycle values of the aforementioned shorter duty cycle sub-time intervals. The average duty cycle may be a weighted average, which may be biased toward the end of the time interval (e.g., biased toward the duty cycle values of the shorter duty cycle sub-time intervals at the end of the longer time interval).

A duty cycle parameter value may relate to operation of an associated applicator, such as a gun cycle count of the associated applicator within a time interval. The associated applicator may be an applicator that receives hot melt adhesive that is or was heated by the heater. For example, an applicator heater (the applicator heater 53 of FIG. 1) may be associated with the applicator (e.g. the applicator 48, 50 of FIG. 1) and thus the duty cycles of the applicator heater may be related to the gun cycle counts of the applicator. The parameter value of a duty cycle parameter may additionally or alternatively relate to one or more adhesive dispensing modules of the applicator, including a single adhesive dispensing module of the applicator or all dispensing modules of the applicator.

The current operating parameters 310 may comprise an applicator parameter 314 associated with a current dispensing or application of hot melt adhesive by the dispensing system. Particularly, the current operating parameters 310 may comprise a current parameter value of the applicator parameter 314. The historic operating parameters 320 may likewise comprise an applicator parameter 324 associated with historic dispensing or application of hot melt adhesive by the dispensing system. Particularly, the historic operating parameters 320 may comprise one or more historic parameter values of the applicator parameter 324. A historic applicator parameter 324 value may be a moving average for the historic applicator parameter 324 based on previous applicator parameter values of the particular historic applicator parameter 324.

The applicator parameters 314, 324 may be an operating parameter of an applicator (e.g., an applicator 48, 50 of FIG. 1) and/or one or more adhesive dispensing modules (e.g., an adhesive dispensing module 54), which shall be referred to generally as an applicator unless clearly indicated otherwise. The applicator parameters 314, 324 may include a count (e.g., quantity of) of gun cycles performed by an applicator during a time interval. Thus, each gun cycle parameter value may be temporally associated with a particular time interval. A gun cycle may refer to a single, discrete instance of hot melt adhesive dispensing or application, such as an open-and-close cycle of a nozzle valve of an applicator. A gun cycle count may refer to the gun cycles of a single applicator (e.g., a single adhesive dispensing module) or may refer to the collective gun cycles of two or more applicators (e.g., the total gun cycles performed by multiple adhesive dispensing modules of an applicator).

Additional or alternative applicator parameters 314, 324 may include a duration of each gun cycle within a time interval, such as an average duration of the gun cycles within a time interval. For example, shorter gun cycle durations may be associated with an applicator configured to dispense small amounts (e.g., "dots") of hot melt adhesive at a high frequency during a time interval. Conversely, a longer gun cycle duration may be associated with an applicator configured to dispense greater amounts (e.g., a line) of hot melt adhesive at a lower frequency during a time interval. An additional or alternative applicator parameter 314, 324 may include a quantity (e.g., volume) of hot melt adhesive dispensed in each gun cycle, such as an average quantity of hot melt adhesive dispensed by a gun cycle within a time interval.

An applicator parameter 314, 324 value may be associated with a heater parameter 312, 322 value. In some instances, a heater parameter 312, 322 value for a time interval may be deemed to correspond with an applicator parameter 314, 324 value for the same time interval. In other instances, a heater parameter 312, 322 value may be offset in time from the associated applicator parameter 314, 324 value, such as one or more time intervals after that of the applicator parameter 314, 324 value. The offset may be determined to compensate for a delay between when a change in an applicator parameter 314, 324 value (e.g., gun cycle count) causes or corresponds to a change in a heater parameter 312, 322 value (e.g., duty cycle value).

The status parameters 330 may generally indicate a status of the applicator (and/or the dispensing system as a whole), such as a current status. The status parameters 330 may further indicate previous instances at which the status of the applicator changed and/or a status of the dispensing system at particular times (a status "snapshot"). The status parameters 330 may include an on/off status of the applicator (and/or the dispensing system as a whole). For an applicator in an off status, the status parameters 330 may include the time that the applicator was turned off and the time that the applicator was last turned on before being currently turned off. For an applicator in an on status, the status parameters 330 may include the time that the applicator was turned on and the time that the applicator was last turned off before being currently turned on. An off status may include a "sleep" status. Yet further status parameters 330 of the dispensing system may include a "ready" status of the applicator (and/or the dispensing system as a whole). The status parameters 330 may include the time that the applicator entered a current ready status and/or the time that the applicator was last in a ready status. A ready status may refer to a state of the applicator in which the hot melt adhesive is at a temperature suitable or preferred for dispensing. A not-ready status may refer to a state of the applicator in which the hot melt adhesive is at a temperature not suitable or preferable for dispensing, such as a setback temperature.

The filtered operating parameters 340 may comprise a heater parameter 342 and an applicator parameter 344. The heater parameter 342 may be similar to the heater parameter 312 of the current operating parameters 310 and the heater parameter 322 of the historic operating parameters 320. Thus the heater parameter 342 may refer to a duty cycle of the heater associated with the applicator. A duty cycle value may be with respect to a time interval. Further, the applicator parameter 344 may refer to the gun cycles of the applicator. A gun cycle count may be with respect to a time interval.

The filtered operating parameters 340 may be based on the current operating parameters 310, the historic operating parameters 320, and/or the status parameters 330. In an embodiment, the filtered operating parameters 340 may be an updated version or instance of the historic operating parameters 320, with the historic operating parameters 320 having been updated based on the current operating parameters 310. Thus, determining the filtered operating parameters 340 may comprise filtering the historic operating parameters 320 based on the current operating parameters 310. Determining the filtered operating parameters 340 may comprise determining or updating a moving average of the historic operating parameters 320, with the current operating parameters 310 serving as additional (e.g., most recent) data points to update the moving average. Thus, the filtered operating parameters 340 may comprise a plurality of moving averages of respective parameter values.

As noted, the historic operating parameters 320 may comprise a moving average of the heater parameter values of the heater parameter 322. Thus, determining the filtered heater parameter 342, particularly the filtered value of the heater parameter 342, may comprise updating the moving average of the historic heater parameter 322 values using the current heater parameter 312 value. The current heater parameter 312 value may be considered a most recent heater parameter value for purposes of updating the moving average. Determining a filtered heater parameter 342 value of the filtered operating parameters 340 may be performed according to Eq. (1) below.

$$d = f^*c + (1-f)^*d_{old} \qquad \text{Eq. (1):}$$

In Eq. (1), d represents an updated moving average of a heater parameter value (i.e., the filtered heater parameter 342 value), f represents a filter factor, c represents a current heater parameter 312 value, and $d_{old}$ represents the historic heater parameter 322 value. The filter factor f may be a number between 0 and 1 and may indicate the degree to which more recent heater parameter values are weighted over more distant heater parameter values.

As also noted, the historic operating parameters 320 may comprise a moving average of the applicator parameter values of the historic applicator parameter 324. Thus, determining a filtered applicator parameter 344, particularly a filtered value of the applicator parameter 344, may comprise updating the moving average of the historic applicator parameter 324 value using the current applicator parameter value 314. The current applicator parameter 314 value may be considered the most recent applicator parameter value for determining the updated moving average. Determining a filtered applicator parameter 344 value may also be performed using Eq. (1) except that d represents an updated moving average of the applicator parameter value (i.e., the filtered applicator parameter 344 value), f represents a filter factor, c represents a current applicator parameter 314 value, and $d_{old}$ represents a historic applicator parameter 324 value. The filter factor f that is used when determining the filtered applicator parameter 344 value may be different than or the same as that used when determining the filtered heater parameter 342 value.

In an embodiment, the current operating parameters 310, the historic operating parameters 320, the status parameters 330, and the filtered operating parameters 340 may be each organized, in whole or in part, as one or more matrices. Such a matrix may represent a block of time comprising a plurality of time intervals. The block of time may be further divided into sub-divisions, each comprising one or more of the plurality of time intervals of the block of time. Each element of the matrix may correspond to a time interval of the plurality of time intervals. Each element of the matrix may comprise one or more parameter values that are temporally associated with the respective time interval. For example, each element may comprise a heater parameter value and/or an applicator parameter value. The one or more parameters of each element also may comprise an on/off status and/or a ready status (or other status parameter 330).

Determining the filtered operating parameter 340 values may comprise performing an element-by-element and parameter-by-parameter update to the moving averages indicated in a matrix of the historic operating parameter 320 values based on the parameter values indicated in corresponding (according to time interval) elements of a matrix of the current operating parameter 310 values.

Figure 4:
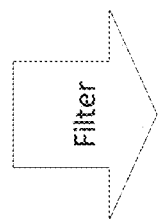
FIG. 4 illustrates an example data flow diagram according to an embodiment of the present disclosure.

Referring to FIG. 4, the current operating parameter 310 values are organized as the current operating parameter matrix 410, the historic operating parameter 320 values are organized as the historic operating parameter matrix 420, and the filtered operating parameter 340 values are organized as the filtered operating parameter matrix 440. The status parameter 330 values may be variously indicated in any of the aforementioned matrices. The matrices 410, 420, 440 each represent a week-long block of time. The matrix 410 for the current operating parameters 310 may represent a specific week, such as a current week or a most recent week. The matrices 420, 440 may represent a week-long block of time in the abstract as they both generally indicate moving averages of parameter values instead of specifically-measured parameter values.

The matrices 410, 420, 440 are each organized into a respective plurality of columns 418, 428, 448 each representing a day of the week. The matrices 410, 420, 440 are also each organized into a respective plurality of rows 416, 426, 446 each representing a time interval of a day (according to a 24-hour clock format). The duration of the time interval for each row is five minutes. Thus a first row is the time interval between 00:00 and 00:05, a second row is the time interval between 00:05 and 00:10, and so forth. Each element of the matrices 410, 420, 440 represents one or more parameter values that correspond to a day of the week and a time interval during that day of the week. A parameter value of an element is represented in FIG. 4 according to the format $[\text{parameter}]_{[day\ of\ week][time\ interval]}$, with the [parameter] field indicating "w" for a heater parameter, "x" for an applicator parameter, "y" for an on/off status parameter, and "z" for a ready status parameter. Thus, $w_{Sun1}|x_{Sun1}|y_{Sun1}|z_{Sun1}$ represents a heater parameter value, applicator parameter value, on/off status parameter value, and ready status parameter value for the time interval between 00:00 and 00:05 (row 1) on a Sunday. The matrix 440 for the filtered operating parameters 340 further uses a prime character (') to denote an updated moving average of a parameter value.

The matrix 440 of the filtered operating parameter 340 values may be determined by updating, on an element-by-element and parameter-by-parameter basis, the historic moving averages of the matrix 420 based on the current parameter values indicated in the matrix 410. A parameter's historic moving average represented in a particular element of the matrix 420 may be updated based on the current parameter value represented in the corresponding element of the matrix 410. The updated moving average (for that day of the week and that time interval within the day) may be indicated in the corresponding element of the matrix 440. The updated moving average may be determined using Eq. (1).

As an example, the historic moving average of the heater parameter value for Sundays during the 23:55-24:00 time interval (represented in the matrix 420 by $w_{Sun288}$) is updated with the current heater parameter value for a current (e.g., most recent) Sunday, 23:55-24:00 time interval (represented in the matrix 410 also by $w_{Sun288}$). The updated moving average of the heater parameter value for the Sunday, 23:55-24:00 time interval is represented in the matrix

440 by $w_{Sun288}'$. This updated moving average of the heater parameter value may be determined according to Eq. (1), wherein c is the current heater parameter value represented by $w_{Sun288}$ in the matrix 410, $d_{old}$ is the moving average of the heater parameter value represented by $w_{Sun288}$ in the matrix 420, and d is the updated moving average of the heater parameter value represented by $w_{Sun288}'$ in the matrix 440.

The updated moving average of the applicator parameter value for the Sunday, 23:55-24:00 time interval, represented by $x_{Sun288}'$ in the matrix 440, is similarly determined by updating the historic moving average of the applicator parameter value (represented in the matrix 420 in the corresponding element by $x_{Sun288}$) with the current applicator parameter value for the current (e.g., most recent) Sunday, 23:55-24:00 time interval (represented in the matrix 410 in the corresponding element also by $x_{Sun288}$). The updated moving average of the applicator parameter value for the Sunday, 23:55-24:00 time interval also may be determined using Eq. (1). The updated on/off status and ready status parameter values (represented in the matrix 440 by $y_{Sun288}'$ and $z_{Sun288}'$, respectively) for the Sunday, 23:55-24:00 time interval is updated to reflect the current on/off status and ready status parameter values (represented in the matrix 410 in the corresponding element by $y_{Sun288}$ and $z_{Sun288}$, respectively). A similar process may be used to determine each element—and heater, applicator, and/or status parameter values thereof—of the filtered operating parameters matrix 440.

The current operating parameters matrix 410 may be determined on a rolling basis as the parameter values of an element are determined. For example, the elements of the matrix 410 may be updated in real or near-real time. Alternatively, the matrix 410 and its elements may be determined at one time. Similarly, the filtered operating parameters matrix 440 may be determined on a rolling basis. For example, the elements of the matrix 440 may be determined as the corresponding elements of the current operating parameters matrix 410 are determined. Alternatively, the matrix 440 and its elements may be determined at one time, such as after all elements of the current operating parameters matrix 410 are determined.

Returning attention to FIG. 3, the filtered operating parameters 340 may be used to determine one or more instructions 350. The instructions 350 may be with respect to one or more operating parameters of the dispensing system. For example, the instructions 350 may relate to the applicator heater or other heater of the dispensing system. Such instructions 350 may cause the applicator heater to raise its target temperature, lower its target temperature, and/or set a target temperature. The instructions 350 may set the heater to a setback temperature. The instructions 350 may cause the heater to turn off, turn on, enter a sleep mode, or "wake" from a sleep mode. The instructions may cause the dispensing system to turn off, turn on, enter a sleep mode, or "wake" from a sleep mode. The instructions 350 may indicate a time for the aforementioned actions to be performed or come into effect.

The instructions 350 may indicate a plurality of instructions to be implemented over a period of time. The plurality of instructions may comprise a schedule according to which the dispensing system and its components are to operate. The schedule may indicate the days and times at which various instructions are to take effect. For example, the schedule may indicate a first turn-on time of the heater for weekdays and a different second turn-on time of the heater for weekend days. These turn-on times may be optimized so that the hot melt adhesive is at a ready temperature when production operation of the dispensing system later commences but not substantially before. As another example, the schedule may indicate a time and setback temperature for the dispensing system to enter a setback mode and a time for the dispensing system to enter a normal mode and raise the temperature of the hot melt adhesive at the applicator to the dispensing temperature.

The instructions 350 may be realized in an electronic or digital form. For example, the instructions 350 may comprise digital data, which may be determined by a remote computer system (e.g., the computer system 230 of FIG. 2) and transmitted to the controller of the dispensing system via a network (e.g., the network 210 of FIG. 2). The controller may receive and process the instructions 350 to effectuate the instructions 350. The instructions 350 may comprise an electrical control signal from the controller to one or more components of the dispensing system, such as the applicator heater. The controller may effectuate the instructions without local user intervention.

Figure 5:
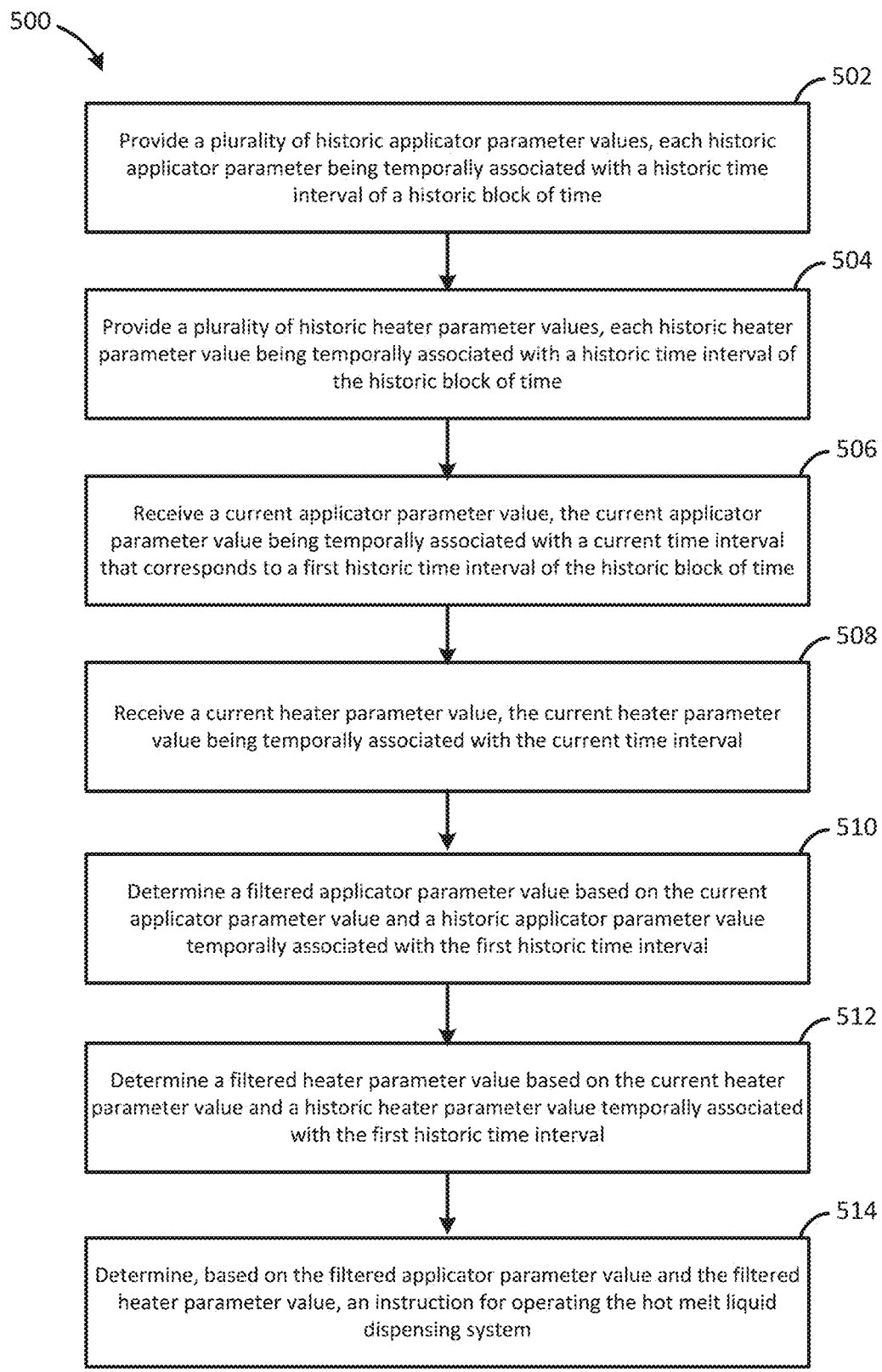
FIG. 5 illustrates an example method flow chart according to an embodiment of the present disclosure.

FIG. 5 illustrates a flow chart of a method 500 for determining one or more instructions for operating a hot melt liquid dispensing system (e.g., the hot melt adhesive system 10 of FIG. 1). In an example embodiment, the method 500 may comprise compiling a record of historic applicator parameter values—each temporally associated with a time interval—of an applicator (e.g., gun cycle counts) and a record of associated historic heater parameter values—each also temporally associated with a time interval—of a heater (e.g., duty cycle values). The historic applicator parameter value temporally associated with each time interval may be filtered (e.g., updated as a moving average) based on a current applicator parameter value that corresponds to that time interval. Likewise, the historic heater parameter value temporally associated with each time interval may be filtered (e.g., updated as a moving average) based on a current applicator parameter value that corresponds to that time interval. Based on the filtered applicator and heater parameter values, an instruction for operating the hot melt liquid dispensing system and/or component(s) thereof may be determined. For example, an instruction may cause, at a specified time, the hot melt liquid heater to raise or lower the temperature of the hot melt liquid to be supplied to the applicator. The specified time may correspond with a time that active operation of the hot melt liquid dispensing system temporarily pauses.

At step 502, a plurality of historic applicator parameter values of a first operating parameter of an applicator (e.g., an applicator 48, 50 and/or adhesive dispensing module(s) 54 of FIG. 1) of the hot melt liquid dispensing system may be provided. A historic applicator parameter value may be the same or similar as the historic applicator parameter 324 value of FIG. 3. A historic applicator parameter value may comprise a gun cycle count of the applicator within a time interval. Each historic applicator parameter value of the plurality of historic applicator parameter values may be temporally associated with a historic time interval of a historic block of time. For example, the plurality of historic applicator parameter values may be realized as a matrix of historic parameter values (e.g., the matrix 420 of FIG. 4), with each element of the matrix representing a historic applicator parameter value and a time interval temporally associated with that historic applicator parameter value. The matrix may represent a week-long historic block of time and be further divided into days of the week corresponding to the columns of the matrix. A time interval may comprise a time duration of five minutes, for example.

At step 504, a plurality of historic heater parameter values of a second operating parameter of a hot melt liquid heater (e.g., the applicator heater 53 of FIG. 2) of the hot melt liquid dispensing system may be provided. A historic heater parameter value may be the same or similar as the historic heater parameter 322 value of FIG. 3. A historic heater parameter value may comprise a duty cycle of the hot melt liquid heater. Each historic heater parameter value of the plurality of historic heater parameter values may be temporally associated with a historic applicator parameter value. For example, a historic heater parameter value may be temporally associated with the same historic time interval as the associated historic applicator parameter value. As another example, a historic heater parameter value may be temporally associated with a historic time interval that is offset from the time interval of the associated historic applicator parameter value. The plurality of historic heater parameter values may be represented in the matrix of historic parameter values along with the plurality of historic applicator parameter values. For example, a historic heater parameter value and its associated historic applicator parameter value may be represented in the same element of the matrix.

A historic applicator parameter value temporally associated with a particular historic time interval (e.g., a time interval of a day of the week) may comprise a moving average of previous historic applicator parameter values (of the first operating parameter of the applicator) that are each temporally associated with corresponding historic time intervals of previous historic blocks of time (e.g., previous days and/or weeks). Similarly, a historic heater parameter value temporally associated with a particular historic time interval may comprise a moving average of previous historic heater parameter values (of the second operating parameter value of the hot melt liquid heater) that are each temporally associated with corresponding historic time intervals of previous historic blocks of time.

At step 506, a current applicator parameter value of the first operating parameter of the applicator may be received. The current applicator parameter value may be the same or similar as the current applicator parameter 314 value of FIG. 3. The current applicator parameter value may be temporally associated with a current time interval. The current applicator parameter value may comprise a gun cycle count of the applicator during the current time interval. The current applicator parameter value may be temporally associated with a current time interval that corresponds to a first historic time interval of the historic block of time. For example, the current applicator parameter value may be temporally associated with a Saturday, 00:05-00:10 current time interval and that current time interval may correspond to the historic time interval represented in the historic operating parameters matrix 420 of FIG. 4 in the element at the intersection of the "Saturday" column and the "00:10" row. By extension, the current applicator parameter value may be associated with the historic applicator parameter value that is temporally associated with the above-noted corresponding first historic time interval. The current applicator parameter value may be one of a plurality of current applicator parameter values that are each temporally associated with a respective current time interval, such as is represented in the current operating parameters matrix 410 of FIG. 4.

At step 508, a current heater parameter value of the second operating parameter of the hot melt liquid heater may be received. The current heater parameter value may be the same or similar as the current heater parameter 312 value of FIG. 3. The current heater parameter value may comprise a duty cycle value for the hot melt liquid heater. The current heater parameter value may be associated with the current applicator parameter value. For example, the current heater parameter value may be temporally associated with the current time interval referred to with respect to the current applicator value. In an aspect, the current heater parameter value and the current application parameter value may both correspond to a same time interval. In other aspects, the current heater parameter value may correspond to a time interval that is temporally offset from a time interval corresponding to the current applicator parameter value.

By association with the current applicator parameter value, the current heater parameter value may be associated with the historic applicator parameter value. For example, the current applicator parameter value and the current heater parameter value may be both temporally associated with the same current time interval and the historic applicator parameter value and the historic heater parameter value may be both temporally associated with the historic time interval that corresponds with that current time interval. The current heater parameter value may be one of a plurality of current heater parameter values that are each temporally associated with respective current time intervals, such as is represented in the current operating parameter matrix 410 of FIG. 4.

At step 510, a filtered applicator parameter value of the first operating parameter of the applicator (e.g., the filtered applicator parameter 344 value of FIG. 3) may be determined based on the current applicator parameter value and a historic applicator parameter value of the plurality of historic applicator parameter values. The historic applicator parameter value used as a basis for determining the filtered applicator parameter value may be temporally associated with the first historic time interval of the historic block of time corresponding to the current time interval (referenced in relation to step 506). That is, the current applicator parameter value and said historic applicator parameter value may both be temporally associated with corresponding time intervals. In an example, the historic applicator parameter value may comprise a moving average of the first operating parameter of the applicator. As such, determining the filtered applicator parameter value may comprise updating the moving average indicated by the historic applicator parameter value, with the current applicator parameter value serving as a later or latest data point for the first operating parameter of the applicator.

At step 512, a filtered heater parameter value of the second operating parameter of the hot melt liquid heater (e.g., the filtered heater parameter 342 value of FIG. 3) may be determined based on the current heater parameter value and a historic heater parameter value of the plurality of historic heater parameter values. The historic heater parameter value used to determine the filtered heater parameter value may be associated with the first historic time interval referred to above with respect to the filtered applicator parameter value. For example, the historic heater parameter value used as a basis for determining the filtered heater parameter value may be associated with the historic applicator parameter value used to determine the filtered applicator parameter value. In particular, the historic heater parameter value used to determine the filtered heater parameter value may be associated with the historic applicator parameter value temporally associated with the first historic time interval of the historic block of time. For example, the historic heater parameter value used to determine the filtered heater parameter value may be temporally associated with a historic time interval that corresponds to the current time interval.

The filtered applicator parameter value and the filtered heater parameter value may be represented in the filtered operating parameters matrix 440 of FIG. 4. The filtered applicator parameter value and the filtered heater parameter value may be temporally associated with the same time interval. For example, the filtered applicator parameter value may be represented by $X_{Sat1}'$ in the matrix 440 and the filtered heater parameter value may be represented by $W_{Sat1}'$ in the matrix 440, which are both temporally associated with the Saturday, 00:00-00:05 time interval. The filtered applicator parameter value may be determined based on the current applicator parameter value for the current Saturday, 00:00-00:05 time interval in the current operating parameters matrix 410, represented by $X_{Sat1}$, and the historic applicator parameter value for the historic Saturday, 00:00-00:05 time interval in the historic operating parameters matrix 420, represented also by $X_{Sat1}$. The filtered heater parameter value may be determined based on the current heater parameter value for the current Saturday, 00:00-00:05 time interval in the current operating parameters matrix 410, represented by $W_{Sat1}$, and the historic heater parameter value for the historic Saturday, 00:00-00:05 time interval in the historic operating parameters matrix 420, represented also by $W_{Sat1}$. A corresponding process may be performed to determine further elements of the filtered operating parameters matrix 440 (i.e., further filtered applicator parameter values and/or further filtered heater parameter values.

At step 514, an instruction (e.g., the instruction(s) 350 of FIG. 3) may be determined based on the filtered applicator parameter values and the filtered heater parameter values. The determined instruction may comprise an instruction for operating the hot melt liquid dispensing system—or components thereof—according to an operating parameter value of a third operating parameter of the hot melt liquid adhesive system. For example, the instruction may be for operating the hot melt liquid heater. Further, the third operating parameter may comprise an operating parameter of the hot melt liquid heater. The operating parameter value of the third operating parameter may comprise a target temperature for the hot melt liquid heater, such as a pre-determined dispensing temperature or a pre-determined setback temperature. The determined instruction may comprise an instruction for the hot melt liquid heater to discontinue applying heat to hot melt liquid, an instruction for the hot melt liquid heater to begin applying heat to hot melt liquid, or instruction for the hot melt liquid heater to enter at least one of an on mode, an off mode, or a ready mode. The determined instruction may comprise an instruction for the hot melt liquid dispensing system to enter an operating mode including at least one of an on mode, an off mode, or a ready mode.

At least a portion of the method 500 may be performed by a computer system remote from the hot melt liquid dispensing system, such as the computer system 230 of FIG. 2. For example, the remote computer system may provide the plurality of historic applicator parameter values and/or the plurality historic heater parameter values. The remote computer system may store such parameter values and provide them from storage. As another example, the remote computer system may receive the current applicator parameter value and/or the current heater parameter value, such as from the controller of the hot melt liquid dispensing system. Using the pluralities of historic applicator parameter values and historic heater parameter values provided from storage and the current applicator parameter value and current heater parameter value received from the hot melt liquid dispensing system, the remote computer system may determine the filtered applicator parameter value and filtered heater parameter value. Further, the remote computer system may determine the instruction for operating the hot melt liquid dispensing system. The remote computer system may transmit the instruction to the controller of the hot melt liquid dispensing system to effectuate the instruction. The instruction may comprise a control signal generated by the controller.

Further disclosed herein are techniques for predicting a time of failure of an applicator (e.g., an applicator 48, 50 and/or an adhesive dispensing module 54 of FIG. 1) of a hot melt liquid dispensing system (e.g., the hot melt adhesive system 10 of FIG. 1). Such failure may be particularly related to air leakage at or by the applicator, which is observed to relate to increased duty cycles of an associated heater (e.g., the applicator heater 53 of FIG. 1). "Failure" is not limited to only a complete failure of operability but may also include those states of the applicator in which performance is unacceptably degraded. For example, performance of the applicator falling below a threshold or outside a threshold range may be considered a failure of the applicator. The performance of the applicator may be measured according to an operating parameter of another component, including the duty cycles of the heater.

The predicted time of failure of the applicator may be determined based on data described, at least in part, in relation to FIG. 3. For example, the predicted time of failure may be determined based on the current operating parameters 310 values, including the current heater parameter 312 values (e.g., current duty cycles) and the current applicator parameter 314 values (e.g., current gun cycle counts). The predicted time of failure may be determined further based on the historic operating parameters 320 values, including the historic heater parameter 322 values (e.g., historic duty cycles) and the historic applicator parameter 324 values (e.g., historic gun cycle counts). The predicated time of failure may be determined yet further based on the status parameters 330, such as a current or historic on, off, or ready status of the applicator, heater, or hot melt liquid dispensing system as a whole.

In an example embodiment, the duty cycle values of the heater may be determined for time intervals during which the applicator performed no gun cycles. The duty cycle values of the heater also may be determined for time intervals during which the applicator performed multiple gun cycles. The duty cycle values during time intervals with no gun cycles and the duty cycle values during time intervals with multiple gun cycles may be compared against one another to determine the predicted time of failure. The average gun cycle count for those time intervals with multiple gun cycles may be determined and also used to determine the predicted time of failure. The duty cycle values for time intervals with no gun cycles, the duty cycle values for time intervals with multiple gun cycles, and the gun cycle counts for time intervals with multiple gun cycles may be each averaged, respectively, over the time intervals of a day or other block of time. A relationship between the three averages may be used to determine the predicted time of failure.

Similar analysis of the gun cycle counts and duty cycle values may be performed with respect to the time intervals of a second day. The duty cycle values for time intervals of the second day with no gun cycles, the duty cycle values for time intervals of the second day with multiple gun cycles, and the gun cycle counts for time intervals of the second day with multiple gun cycles may be also averaged. The relationship between the three averages for the second day may be compared with the analogous relationship between the three averages for the initial day. This comparison may be yet a further basis for determining the predicted time of failure. Similar duty cycle/gun cycle relationships for additional days may be also determined and analyzed in conjunction with the duty cycle/gun cycle relationship for the first day and the duty cycle/gun cycle relationship for the second day. For example, the duty cycle/gun cycle relationship for each of the days may be plotted on a graph and a trend may be identified that indicates a predicted time of failure. The trend may be identified by fitting a curve (e.g., a mathematical function) to said data points plotted on the graph.

Figure 6:
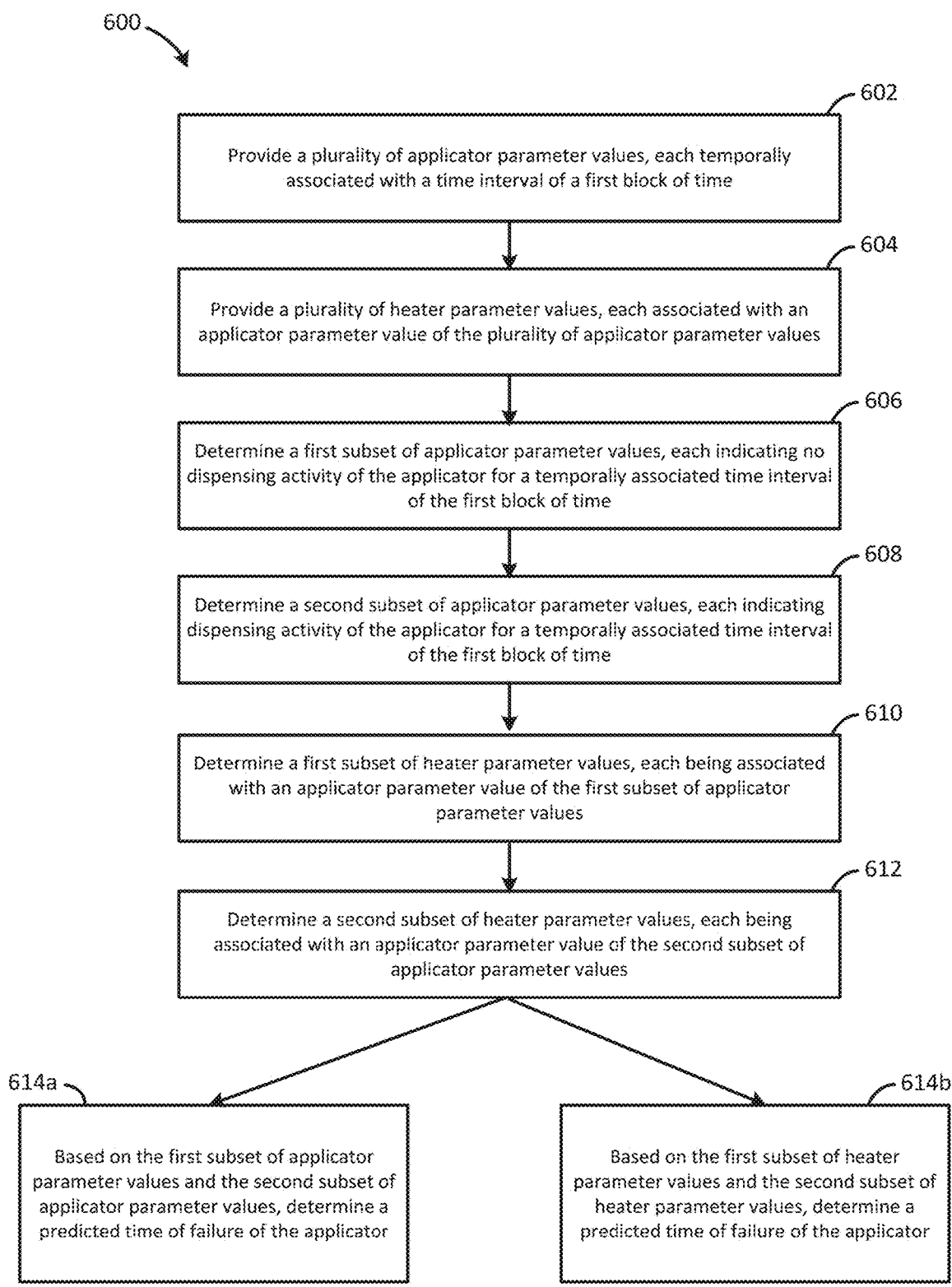
FIG. 6 illustrates an example method flow chart according to an embodiment of the present disclosure.

FIG. 6 illustrates a flow chart of a method 600 for predicting a time of failure of an applicator (e.g., an applicator 48, 50 and/or an adhesive dispensing module 54 of FIG. 1) of a hot melt liquid dispensing system (e.g., the hot melt adhesive system 10 of FIG. 1) having a heater (e.g., the applicator heater 53 of FIG. 1) associated with the applicator. At step 602, a plurality of applicator parameter values of a first operating parameter of the applicator (e.g., the applicator parameters 314, 324 of FIG. 3) may be provided. Each applicator parameter value of the plurality of applicator parameter values may be temporally associated with a time interval of a first block of time. The first operating parameter of the applicator may be a count of gun cycles performed by the applicator within a time interval (e.g. a speed and/or response time of the applicator during the time interval). Thus an applicator parameter value may comprise a gun cycle count for the temporally associated time interval. An applicator parameter value may indicate a gun cycle count of zero, one, or multiple gun cycles.

The first block of time may comprise a first day or portion thereof. The time intervals of the first day or other block of time need not include every possible time interval within the day or other block of time. For example, the time intervals of the first block of time may be limited to those time intervals during which at least one of the applicator, the heater, or the hot melt liquid dispensing system is turned on. Additionally or alternatively, the time intervals of the first block of time may be limited to those time intervals during which at least one of the applicator, the heater, or the hot melt liquid dispensing system is in a ready status. A time interval may have a time duration in the inclusive range of one minute to ten minutes. As examples, a time interval may have a time duration of five minutes or a time duration of ten minutes.

At step 604, a plurality of heater parameter values of a second operating parameter of the heater (e.g., the heater parameters 312, 322 of FIG. 3) may be provided. Step 604 may be optional in some embodiments and the method 600 may instead proceed to step 606. Each heater parameter value of the plurality of applicator parameter values may be associated with an applicator parameter value of the plurality of applicator parameter values. Each heater parameter value may be further temporally associated with a time interval of the first block of time. The second operating parameter of the heater may comprise a duty cycle of the heater over a time interval. A heater parameter value and the associated applicator parameter value may be both temporally associated with the same time interval of the first block of time. Or the heater parameter value may be temporally associated with a time interval that is offset from the time interval of the temporally associated applicator parameter value, such as to compensate for a delayed effect to the heater's duty cycle caused by a change to the applicator's gun cycles.

At step 606, a first subset of applicator parameter values of the plurality of applicator parameter values may be determined. The first subset (and second subset, discussed below) of applicator parameter values may be determined according to the dispensing activity of the applicator during respective time intervals, particularly the gun cycle counts of the applicator during respective time intervals, and more particularly whether a given applicator parameter value of the plurality of applicator parameter values indicates no gun cycles during a temporally associated time interval (e.g., a zero gun cycle count) or one or more gun cycles during a temporally associated time interval (e.g., a non-zero or multiple gun cycle count). The first subset of applicator parameter values may comprise those applicator parameter values of the plurality of applicator parameter values that indicate no dispensing activity, that is, a zero gun cycle count, during a temporally associated time interval.

At step 608, a second subset of applicator parameter values of the plurality of applicator parameter values may be determined. The second subset of applicator parameter values may include those applicator parameter values that indicate dispensing activity of the applicator during a temporally associated time interval. The second subset of applicator parameter values may include those applicator parameter values that exceed a threshold applicator parameter value or are within a threshold applicator parameter value range. For example, the second subset of applicator parameter values may include those applicator parameter values that indicate a gun cycle count that exceeds a threshold gun cycle count or is within a threshold range of gun cycle counts. The threshold gun cycle count may be zero, thus the second subset of applicator parameter values may include all applicator parameter values indicating a non-zero gun cycle count. Alternatively, the threshold gun cycle count may be greater than zero, thus making it possible that some applicator parameter values may be included in neither the first nor the second subset of applicator parameter values.

At step 610, a first subset of heater parameter values of the plurality of heater parameter values may be determined, with each heater parameter value (e.g. a duty cycle value of the heater for a time interval) of the first subset of heater parameter values being associated with an applicator parameter value of the first subset of applicator parameter values. As such, each heater parameter value of the first subset of heater parameter values may be associated with an applicator parameter value that indicates no dispensing activity by the applicator (e.g., a zero gun cycle count) during the time interval temporally associated with the applicator parameter value. For example, each heater parameter value of the first subset of heater parameter values may be temporally associated with a time interval during which no dispensing activity by the applicator occurred. Step 610 may be optional in some embodiments and the method 600 may instead proceed to step 614a and/or step 614b.

At step 612, a second subset of heater parameter values of the plurality of heater parameter values may be determined, with each heater parameter value (e.g. a duty cycle value of the heater for a time interval) of the second subset of heater parameter values being associated with an applicator parameter value of the second subset of applicator parameter values. As such, each heater parameter value of the second subset of heater parameter values may be associated with an applicator parameter value of the second subset of applicator parameter values that indicates dispensing activity (e.g., a non-zero or multiple gun cycle count) during the time interval temporally associated with the applicator parameter value. For example, each heater parameter value of the second subset of heater parameter values may be temporally associated with a time interval during which dispensing activity by the applicator occurred. Step 612 may be optional in some embodiments and the method 600 may instead proceed to step 614a and/or step 614b.

The first and/or second subsets of applicator parameter values and/or the first and/or second subsets of heater parameter values may be further limited to include only those parameter values that are temporally associated with a time interval during which at least one of the heater, the applicator, or the hot melt liquid dispensing system (as appropriate) is in a ready status. The first and/or second subsets of applicator parameter values and/or the first and/or second subsets of heater parameter values may be additionally or alternatively limited to include only those parameter values that are temporally associated with a time interval during which the hot melt liquid to be supplied to the applicator is at a temperature suitable or preferred for dispensing. For example, the first subset of applicator parameter values and the first subset of heater parameter values may be limited to exclude parameter values temporally associated with time intervals during which the hot melt liquid dispensing system is turned off even though no dispensing activity occurred during those time intervals.

The method 600 may include one or both of steps 614a and 614b. At steps 614a and/or 614b, a predicted time of failure of the applicator may be determined. The predicted time of failure indicated in steps 614a and 614b may refer to the same predicted time of failure. In step 614a, a predicted time of failure of the applicator may be determined based on the first subset of applicator parameter values and the second subset of applicator parameter values. In step 614b, a predicted time of failure of the applicator may be determined based on the first subset of heater parameter values and the second subset of heater parameter values. In instances in which the method 600 includes both steps 614a and 614b, the predicted time of failure of the applicator may be determined based on the first subset of applicator parameter values, the second subset of applicator parameter values, the first subset of heater parameter values, and the second subset of heater parameter values. Alternatively (not shown), the predicted time of failure of the applicator may be determined based on the first subset of heater parameter values and the second subset of heater parameter values. That is, the method 600 in this instance may include step 614b but not step 614a.

As an example, the predicted time of failure of the applicator may be determined based on one or more heater parameter values (e.g., duty cycle values) each temporally associated with a time interval during which no dispensing activity by the applicator occurred (a zero gun cycle count) and one or more heater parameter values (e.g., duty cycle values) each temporally associated with a time interval during which dispensing activity by the applicator did occur (a non-zero or multiple gun cycle count). The determining the predicted time of failure may comprise comparing one or more heater parameter values of the first subset of heater parameter values with one or more heater parameter values of the second subset of heater parameter values.

The predicted time of failure may be further based on an average of the duty cycle values temporally associated with time intervals during which no gun cycles occurred and an average of the duty cycle values temporally associated with time intervals during which one or more gun cycles occurred. The first block of time may comprise a day, thus making the two duty cycle averages per-day averages. The two duty cycle averages may be compared to one another in determining the predicted time of failure. Accordingly, determining the predicted time of failure may further comprise comparing an average the first subset of heater parameter values with an average of the second subset of heater parameter values.

The predicted time of failure of the applicator may be further based on the non-zero gun cycle counts, such as an average of the non-zero gun cycle counts occurring during two or more time intervals of the first block of time. For example, the predicted time of failure may be based on the average of the duty cycle values temporally associated with time intervals during which no gun cycles occurred, the average of the duty cycle values temporally associated with time intervals during which one or more gun cycles occurred, and the average of the gun cycle counts temporally associated with time intervals during which one or more gun cycles occurred. Thus, the predicted time of failure of the applicator may be based on an average duty cycle value of the first subset of heater parameter values, an average duty cycle value of the second subset of heater parameter values, and an average gun cycle count of the second subset of applicator parameter values.

The predicted time of failure of the applicator may be based on a relationship (i.e., a first parameter relationship associated with the first block of time) between the average duty cycle value for the first subset of heater parameter values, the average duty cycle value for the second subset of heater parameter values, and the average gun cycle count for the second subset of applicator parameter values. The first parameter relationship may reflect a difference between the average duty cycle value of the second subset of heater parameter values and the average duty cycle value of the first subset of heater parameter values. The first parameter relationship may further comprise a relationship between the average gun cycle count of the second subset of applicator parameter values (e.g., non-zero or multiple gun cycle counts) and the above-noted difference between the average duty cycle value of the second subset of heater parameter values and the average duty cycle value of the first subset of heater parameter values. For example, the first parameter relationship may be reflected in Eq. (2) below.

$$R = \frac{(A_g - A_0)}{g} \quad \text{Eq. (2):}$$

In Eq. (2), R may be a value representing the first parameter relationship (or other analogous relationship associated with another block of time). R may represent a slope or other relationship suitable for plotting on a graph comprising a y-axis indicating an increasing duty cycle value for an applicator in a "failed" state and an x-axis indicating an increasing duty cycle value for an applicator that is not in a failed state. $A_g$ may represent the average duty cycle value of the second subset of heater parameter values (temporally associated with non-zero gun cycle count time intervals) and $A_0$ may represent the average duty cycle value of the first subset of heater parameter values (temporally associated with zero (0) gun cycle count time intervals). g may represent the average gun cycle count of the second subset of applicator parameter values (e.g., non-zero or multiple gun cycle counts).

The predicted time of failure of the applicator may be determined further based on additional applicator and heater parameter values temporally associated with time intervals of one or more additional blocks of time, such as one or more additional days. For example, the method 600 may further comprise providing a second plurality of applicator parameter values of the first operating parameter of the applicator (e.g., gun cycle counts) and providing a second plurality of heater parameter values of the second operating parameter of the heater (e.g., duty cycle values). The second plurality of applicator parameter values may be analogous in some aspects with the first plurality of applicator parameter values except that, at the least, each applicator parameter value of the second plurality of applicator parameter values may be temporally associated with a time interval of a second block of time. For example, the first block of time may be the first day and the second block of time may be a second day. The first and second blocks of time may be non-overlapping.

Similarly, the second plurality of heater parameter values may be analogous in some aspects with the first plurality of heater parameter values except that, at the least, each heater parameter value of the second plurality of heater parameter values may be associated with an applicator parameter value of the second plurality of applicator parameter values. Each heater parameter value of the second plurality of heater parameter values further may be temporally associated with a time interval of the second block of time, such as the same time interval as that of the applicator parameter value associated with the heater parameter value.

The method 600 may further include determining third and fourth subsets of applicator parameter values of the second plurality of applicator parameter values. Analogous in some aspects to the first subset of applicator parameter values (associated with the first block of time), each applicator parameter value of the third subset of applicator parameter values may indicate that no dispensing activity by the applicator occurred during the temporally associated time interval of the second block of time. As such, each applicator parameter value of the third subset of applicator parameter values may indicate a gun cycle count of zero. Analogous in some aspects to the second subset of applicator parameter values (associated with the first block of time), each applicator parameter value of the fourth subset of applicator parameter values may indicate that dispensing activity by the applicator did occur during the temporally associated time interval of the second block of time. As such, each applicator parameter value of the fourth subset of applicator parameter values may indicate a non-zero or multiple gun cycle count.

The method 600 may further include determining third and fourth subsets of heater parameter values of the second plurality of heater parameter values. Analogous in some aspects to the first subset of heater parameter values (associated with the first block of time), each heater parameter value of the third subset of heater parameter values may be associated with an applicator parameter value of the third subset of applicator parameter values. As such, each heater parameter value of the third subset of heater parameter values may be associated with a zero gun cycle count, such as a time interval during which no dispensing activity occurred. Analogous in some aspects to the second subset of heater parameter values (associated with the first block of time), each heater parameter value of the fourth subset of heater parameter values may be associated with an applicator parameter value of the fourth subset of applicator parameter values. Thus, each heater parameter value of the fourth subset of heater parameter values may be associated with a non-zero or multiple gun cycle count, such as a time interval during which dispensing activity by the applicator occurred.

In the method 600, the predicted time of failure of the applicator may be further based on the third subset of heater parameter values and the fourth subset of heater parameter values. For example, the predicted time of failure of the applicator may be based on duty cycle values of the heater that are temporally associated with time intervals of the second block of time in which no dispensing activity by the applicator occurred (e.g., zero gun cycle counts) and duty cycle values of the heater that are temporally associated with time intervals of the second block of time during which dispensing activity by the applicator did occur (e.g., non-zero or multiple gun cycle counts).

The predicted time of failure may be further based on an average duty cycle value of the third subset of heater parameter values, an average duty cycle value of the fourth subset of heater parameter values, and an average gun cycle count of the fourth subset of applicator parameter values. Particularly, the predicted time of failure of the applicator may be based on a relationship (i.e., a second parameter relationship associated with the second block of time) between the average duty cycle value of the third subset of heater parameter values, the average duty cycle value of the fourth subset of heater parameter values, and the average gun cycle count of the fourth subset of applicator parameter values. Similar to the first parameter relationship associated with the first block of time, the second parameter relationship may reflect a difference between the average duty cycle value of the fourth subset of heater parameter values and the average duty cycle value of the third subset of heater parameter values. Also similar to the first parameter relationship, the second parameter relationship may further comprise a relationship between the average gun cycle count of the fourth subset of applicator parameter values (e.g., non-zero or multiple gun cycle counts) and the above-noted difference between the average duty cycle value of the fourth subset of heater parameter values and the average duty cycle value of the third subset of heater parameter values. Yet again similar to the first parameter relationship, the second parameter relationship may be represented in Eq. (2).

Determining the predicted failure time of the applicator may comprise comparing the first parameter relationship associated with the first block of time (e.g., the first day) with the second parameter relationship associated with the second block of time (e.g., the second day). Comparing the first parameter relationship and the second parameter relationship may comprise determining a trend (e.g., a statistical trend) between the first parameter relationship and the second parameter relationship. The trend may be with respect to gun cycle counts and heater duty cycle values associated with said gun cycle counts. Determining the predicted failure time of the applicator may further comprise fitting a curve (e.g., a mathematical function) to the trend, such as when the first and second parameter relationships are plotted on a graph.

Determining the predicted failure time of the applicator may be further based on one or more other parameter relationships in addition to the first and second parameter relationships. Each of the one or more other parameter relationships may be associated, respectively, with other blocks of time (e.g., a day) different from the first and second blocks of time. Each of the one or more other parameter relationships may be based on respective pluralities of applicator and heater parameter values temporally associated with the respective other blocks of time. Each of the one or more other parameter relationships may be determined in a manner analogous, in some aspects, with the manner in which the first and second parameter relationships may be determined.

Accordingly, determining the predicted failure time of the applicator may further comprise performing a comparison between the first, second, and the one or more other parameter relationships. The comparison may comprise determining a trend (e.g., a statistical trend) between the first, second, and the one or more other parameter relationships. The comparison may further comprise determining a curve to fit the trend, such as when the first, second, and the one or more other parameter relationships are graphically plotted.

One skilled in the art will appreciate that the systems and methods disclosed herein may be implemented via a computing device that may comprise, but are not limited to, one or more processors, a system memory, and a system bus that couples various system components including the processor to the system memory. In the case of multiple processors, the system may utilize parallel computing.

For purposes of illustration, application programs and other executable program components such as the operating system are illustrated herein as discrete blocks, although it is recognized that such programs and components reside at various times in different storage components of the computing device, and are executed by the data processor(s) of the computer. An implementation of service software may be stored on or transmitted across some form of computer readable media. Any of the disclosed methods may be performed by computer readable instructions embodied on computer readable media. Computer readable media may be any available media that may be accessed by a computer. By way of example and not meant to be limiting, computer readable media may comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer. Application programs and the like and/or storage media may be implemented, at least in part, at a remote system.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Recitation of ranges of values herein are merely intended to serve as a shorthand method of referring individually to each separate value falling within the range, unless otherwise indicated herein, and each separate value is incorporated into the specification as if it were individually recited herein.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that may be performed it is understood that each of these additional steps may be performed with any specific embodiment or combination of embodiments of the disclosed methods.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification. It will be apparent to those skilled in the art that various modifications and variations may be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method for determining an operating instruction for a hot melt liquid dispensing system having an applicator configured to dispense hot melt liquid and a hot melt liquid heater associated with the applicator, the method comprising:
providing a plurality of historic applicator parameter values of a first operating parameter of the applicator, each historic applicator parameter value of the plurality of historic applicator parameter values being temporally associated with a historic time interval of a historic block of time;
providing a plurality of historic heater parameter values of a second operating parameter of the hot melt liquid heater, each historic heater parameter value of the plurality of historic heater parameter values being temporally associated with a historic time interval of the historic block of time;
receiving a current applicator parameter value of the first operating parameter of the applicator, the current applicator parameter value being temporally associated with a current time interval that corresponds to a first historic time interval of the historic block of time;
receiving a current heater parameter value of the second operating parameter of the hot melt liquid heater, the current heater parameter value being temporally associated with the current time interval;

determining a filtered applicator parameter value of the first operating parameter of the applicator based on the current applicator parameter value and a historic applicator parameter value of the plurality of historic applicator parameter values temporally associated with the first historic time interval of the historic block of time;

determining a filtered heater parameter value of the second operating parameter of the hot melt liquid heater based on the current heater parameter value and a historic heater parameter value of the plurality of historic heater parameter values temporally associated with the first historic time interval of the historic block of time; and determining, based on the filtered applicator parameter value and the filtered heater parameter value, an instruction for operating the hot melt liquid dispensing system according to an operating parameter value of a third operating parameter of the hot melt liquid dispensing system.

2. The method of claim 1, wherein the current applicator parameter value and the current heater parameter value are received by a computer system located remote from the hot melt liquid dispensing system.

3. The method of claim 1, wherein the first operating parameter of the applicator is associated with a gun cycle of the applicator.

4. The method of claim 3, wherein the first operating parameter of the applicator comprises a gun cycle count of the applicator during a temporally associated time interval.

5. The method of claim 1, wherein the second operating parameter of the hot melt liquid heater is associated with a duty cycle of the hot melt liquid heater.

6. The method of claim 5, wherein the second operating parameter of the hot melt liquid heater comprises a duty cycle value of the hot melt liquid heater during a temporally associated time interval.

7. The method of claim 1, wherein the historic applicator parameter value comprises a moving average of the first operating parameter of the applicator over a plurality of historic time intervals corresponding to the first historic time interval of the historic block of time.

8. The method of claim 7, wherein determining the filtered applicator parameter value comprises updating the moving average of the first operating parameter of the applicator with the current applicator parameter value.

9. The method of claim 8, wherein the moving average of the first operating parameter of the applicator comprises an exponentially weighted moving average.

10. The method of claim 1, wherein the historic heater parameter value comprises a moving average of the second operating parameter of the hot melt liquid heater over a plurality of historic time intervals corresponding to the first historic time interval of the historic block of time.

11. The method of claim 10, wherein determining the filtered heater parameter value comprises updating the moving average of the second operating parameter of the hot melt liquid heater with the current heater parameter value.

12. The method of claim 11, wherein the moving average of the second operating parameter of the hot melt liquid heater comprises an exponentially weighted moving average.

13. The method of claim 1, wherein the third operating parameter of the hot melt liquid dispensing system is associated with a temperature of hot melt liquid.

14. The method of claim 13, wherein the operating parameter value of the third operating parameter comprises a target temperature for the hot melt liquid heater.

15. The method of claim 14, wherein the target temperature comprises at least one of a pre-determined dispensing temperature or a pre-determined setback temperature, the setback temperature being lower than the dispensing temperature.

16. The method of claim 13, wherein the instruction for operating the hot melt liquid dispensing system according to the operating parameter value of the third operating parameter comprises an instruction for the hot melt liquid heater to discontinue applying heat.

17. The method of claim 13, wherein the instruction for operating the hot melt liquid dispensing system according to the operating parameter value of the third operating parameter comprises an instruction for the hot melt liquid heater to begin to apply heat to hot melt liquid.

18. The method of claim 13, wherein the instruction for operating the hot melt liquid dispensing system according to the operating parameter value of the third operating parameter comprises an instruction for the hot melt liquid heater to enter an operating mode including at least one of an on mode, an off mode, a setback mode, or a ready mode.

19. The method of claim 1, wherein the instruction for operating the hot melt liquid dispensing system according to the operating parameter value of the third operating parameter comprises an instruction for the hot melt liquid dispensing system to enter an operating mode including at least one of an on mode, an off mode, a setback mode, or a ready mode.

20. The method of claim 1, wherein the historical block of time comprises a week.

21. The method of claim 1, wherein the historical block of time is organized as a matrix, each element of the matrix representing a historic time interval of the historic block of time.

22. The method of claim 21, wherein each element of the matrix indicates a historic applicator parameter value of the plurality of historic applicator parameter values and an associated historic heater parameter value of the plurality of historic heater parameter values.

23. The method of claim 1, wherein a historic time interval of the historic block of time has a time duration in an inclusive range of one minute to ten minutes.

24. The method of claim 1, further comprising:
receiving a second current applicator parameter value of the first operating parameter of the applicator, the second current applicator parameter value being temporally associated with a second current time interval that corresponds to a second historic time interval of the historic block of time;

receiving a second current heater parameter value of the second operating parameter of the hot melt liquid heater, the second current heater parameter value being temporally associated with the second current time interval;

determining a second filtered applicator parameter value of the first operating parameter of the applicator based on the second current applicator parameter value and a second historic applicator parameter value of the plurality of historic applicator parameter values temporally associated with the second historic time interval of the historic block of time; and determining a second filtered heater parameter value of the second operating parameter of the hot melt liquid heater based on the second current heater parameter value and a second historic heater parameter value of the plurality of historic heater parameter values temporally associated with the second historic time interval of the historic block of time, wherein the instruction for operating the hot melt liquid dispensing system according to the operating parameter value of the third operating parameter of the hot melt liquid dispensing system is further based on the second filtered applicator parameter value and the second filtered heater parameter value.

25. The method of claim 1, wherein the current heater parameter value being associated with the current time interval comprises the current heater parameter value corresponding to a time interval temporally offset from a time interval corresponding to the current applicator parameter value.

26. The method of claim 1, wherein the current heater parameter value and the current applicator parameter value both correspond to a same time interval.

27. A method of predicting failure of an applicator of a hot melt liquid dispensing system, the applicator configured to dispense hot melt liquid and the hot melt liquid dispensing system further having a hot melt liquid heater associated with the applicator, the method comprising:
providing a plurality of applicator parameter values of a first operating parameter of the applicator, each applicator parameter value of the plurality of applicator parameter values being temporally associated with a time interval of a first block of time;
determining a first subset of applicator parameter values of the plurality of applicator parameter values, each applicator parameter value of the first subset of applicator parameter values indicating no dispensing activity of the applicator for a temporally associated time interval of the first block of time;
determining a second subset of applicator parameter values of the plurality of applicator parameter values, each applicator parameter value of the second subset of applicator parameter values indicating dispensing activity of the applicator for a temporally associated time interval of the first block of time; and
based on the first subset of applicator parameter values and the second subset of applicator parameter values, determining a predicted time of failure of the applicator.

28. The method of claim 27, wherein the first operating parameter of the applicator comprises a gun cycle count of the applicator during a temporally associated time interval.

29. The method of claim 28, wherein determining the first subset of applicator parameter values comprises determining that each applicator parameter value of the first subset of applicator parameter values indicates a gun cycle count of zero during a temporally associated time interval.

30. The method of claim 29, wherein determining the second subset of applicator parameter values comprises determining that each applicator parameter value of the second subset of applicator parameter values indicates a gun cycle count during a temporally associated time interval that exceeds a threshold gun cycle count.

31. The method of claim 28, wherein the predicted time of failure of the applicator is further based on the gun cycle count of each applicator parameter value of the first subset of applicator parameter values.

32. The method of claim 27, wherein the hot melt liquid dispensing system further comprises a hot melt liquid heater associated with the applicator, the method further comprising:

providing a plurality of heater parameter values of a second operating parameter of the hot melt liquid heater, each heater parameter value of the plurality of heater parameter values being associated with an applicator parameter value of the plurality of applicator parameter values;
determining a first subset of heater parameter values of the plurality of heater parameter values, each heater parameter value of the first subset of heater parameter values being associated with an applicator parameter value of the first subset of applicator parameter values; and
determining a second subset of heater parameter values of the plurality of heater parameter values, each heater parameter value of the second subset of heater parameter values being associated with an applicator parameter value of the second subset of applicator parameter values,
wherein the predicted time of failure of the applicator is further based on the second subset of heater parameter values.

33. The method of claim 32, wherein the second operating parameter of the hot melt liquid heater comprises a duty cycle of the hot melt liquid heater during a temporally associated time interval.

34. The method of claim 33, wherein determining the predicted time of failure of the applicator comprises comparing one or more heater parameter values of the first subset of heater parameter values to one or more heater parameter values of the second subset of heater parameter values.

35. The method of claim 34, wherein comparing one or more heater parameter values of the first subset of heater parameter values to one or more heater parameter values of the second subset of heater parameter values comprises comparing an average of the first subset of heater parameter values to an average of the second subset of heater parameter values.

36. The method of claim 33, wherein the predicted time of failure of the applicator is further based on an average duty cycle value of the first subset of heater parameter values, an average duty cycle value of the second subset of heater parameter values, and an average gun cycle count of the second subset of applicator parameter values.

37. The method of claim 33, further comprising:
providing a second plurality of applicator parameter values of the first operating parameter of the applicator, each applicator parameter value of the second plurality of applicator parameter values being temporally associated with a time interval of a second block of time;
providing a second plurality of heater parameter values of the second operating parameter of the hot melt liquid heater, each heater parameter value of the plurality of heater parameter values being associated with an applicator parameter value of the second plurality of applicator parameter values;
determining a third subset of applicator parameter values of the second plurality of applicator parameter values, each applicator parameter value of the third subset of applicator parameter values indicating no dispensing activity of the applicator for a temporally associated time interval of the second block of time;
determining a fourth subset of applicator parameter values of the second plurality of applicator parameter values, each applicator parameter value of the fourth subset of applicator parameter values indicating dispensing activity of the applicator for a temporally associated time interval of the second block of time;

determining a third subset of heater parameter values of the second plurality of heater parameter values, each heater parameter value of the third subset of heater parameter values being associated with an applicator parameter value of the third subset of applicator parameter values; and determining a fourth subset of heater parameter values of the second plurality of heater parameter values, each heater parameter value of the fourth subset of heater parameter values being associated with an applicator parameter value of the fourth subset of applicator parameter values, wherein the predicted time of failure of the applicator is further based on the third subset of heater parameter values and the fourth subset of heater parameter values.

38. The method of claim 37, wherein the first block of time comprises a first day and the second block of time comprises a second day subsequent to the first day.

39. The method of claim 37, wherein a time interval of the first block of time has a time duration in an inclusive range of one minute to ten minutes.

40. The method of claim 37, wherein the predicted time of failure of the applicator is further based on an average duty cycle value of the third subset of heater parameter values, an average duty cycle value of the fourth subset of heater parameter values, and an average gun cycle count of the fourth subset of applicator parameter values.

41. The method of claim 40, wherein the determining the predicted time of failure of the applicator comprises:
comparing a first parameter relationship associated with the first block of time with a second parameter relationship associated with the second block of time,
wherein the first parameter relationship is between the average duty cycle value of the first subset of heater parameter values, the average duty cycle value of the second subset of heater parameter values, and the average gun cycle count of the second subset of applicator parameter values, and
wherein the second parameter relationship is between the average duty cycle value of the third subset of heater parameter values, the average duty cycle value of the fourth subset of heater parameter values, and the average gun cycle count of the fourth subset of applicator parameter values.

42. The method of claim 41, wherein:
the first parameter relationship reflects a difference between the average duty cycle value of the second subset of heater parameter values and the average duty cycle value of the first subset of heater parameter values, and
the second parameter relationship reflects a difference between the average duty cycle value of the fourth subset of heater parameter values and the average duty cycle value of the third subset of heater parameter values.

43. The method of claim 42, wherein:
the first parameter relationship further comprises a relationship between the average gun cycle count of the second subset of applicator parameter values and the difference between the average duty cycle value of the second subset of heater parameter values and the average duty cycle value of the first subset of heater parameter values, and
the second parameter relationship further comprises a relationship between the average gun cycle count of the fourth subset of applicator parameter values and the difference between the average duty cycle value of the fourth subset of heater parameter values and the average duty cycle value of the third subset of heater parameter values.

44. The method of claim 43, wherein determining the predicted time of failure of the applicator comprises comparing the first parameter relationship, the second parameter relationship, and one or more other parameter relationships each temporally associated with a block of time other than the first block of time and the second block of time.

45. The method of claim 44, wherein determining the predicted time of failure of the applicator comprises determining a statistical trend between the first parameter relationship, the second parameter relationship, and the one or more other parameter relationships.

46. The method of claim 45, wherein determining the statistical trend comprising determining a mathematical function to fit the statistical trend.

47. The method of claim 32, wherein a time interval of the first block of time comprises a time interval during which at least one of the applicator, the hot melt liquid heater, or the hot melt liquid dispensing system is in a ready status.

48. The method of claim 32, wherein a heater parameter value of the plurality of heater parameter values is temporally associated with a same time interval as the time interval temporally associated with the applicator parameter value associated with the heater parameter value.

49. The method of claim 32, wherein a heater parameter value of the plurality of heater parameter values is temporally associated with a time interval offset from the time interval temporally associated with the applicator parameter value associated with the heater parameter value.

50. The method of claim 32, wherein the predicted time of failure of the applicator relates to air leakage associated with the applicator.

* * * * *